(12) United States Patent
Nishikawa et al.

(10) Patent No.: US 8,529,169 B2
(45) Date of Patent: Sep. 10, 2013

(54) DRILLING TOOL WITH DUST COLLECTOR

(75) Inventors: Tomomasa Nishikawa, Ibaraki (JP); Kenji Kobori, Ibaraki (JP); Tsukasa Suzuura, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 1266 days.

(21) Appl. No.: 12/329,408

(22) Filed: Dec. 5, 2008

(65) Prior Publication Data

US 2009/0148248 A1 Jun. 11, 2009

(30) Foreign Application Priority Data

Dec. 7, 2007 (JP) ................. P2007-316696
Mar. 28, 2008 (JP) ................. P2008-087292

(51) Int. Cl.
*B23B 47/34* (2006.01)
(52) U.S. Cl.
USPC ............................................. 408/67
(58) Field of Classification Search
USPC ................. 408/67, 56, 58, 61; 173/75, 198, 173/171, 199; 175/209, 213; 409/137
See application file for complete search history.

(56) References Cited

U.S. PATENT DOCUMENTS

| | | | | |
|---|---|---|---|---|
| 3,103,069 A * | 9/1963 | Gary | ................. | 30/124 |
| 4,097,176 A * | 6/1978 | Wanner et al. | ................. | 408/56 |
| 4,915,550 A | 4/1990 | Arai et al. | | |
| 5,467,835 A | 11/1995 | Obermeier et al. | | |
| 5,779,402 A * | 7/1998 | Kameda | ................. | 408/56 |
| 6,200,075 B1 * | 3/2001 | Gaskin et al. | ................. | 408/67 |
| 6,851,898 B2 * | 2/2005 | Ege et al. | ................. | 408/67 |
| 7,134,817 B2 * | 11/2006 | Kado et al. | ................. | 409/137 |
| 7,425,109 B2 * | 9/2008 | Simm et al. | ................. | 408/67 |
| 2002/0141836 A1 * | 10/2002 | Ege et al. | ................. | 408/67 |
| 2004/0192184 A1 * | 9/2004 | Staas et al. | ................. | 454/49 |
| 2004/0208715 A1 * | 10/2004 | Arich | ................. | 408/67 |
| 2005/0089380 A1 | 4/2005 | Stoerig | | |
| 2005/0281627 A1 * | 12/2005 | Britz | ................. | 408/67 |
| 2008/0202781 A1 * | 8/2008 | Nishikawa et al. | ................. | 173/104 |
| 2009/0214307 A1 * | 8/2009 | Nguyen | ................. | 408/56 |

FOREIGN PATENT DOCUMENTS

| | | |
|---|---|---|
| DE | 4342022 A1 | 6/1994 |
| DE | 19713149 | 10/1997 |
| DE | 10 2004 035875 | 12/2005 |
| JP | 243115 | 3/1990 |
| JP | H05-12059 U | 2/1993 |
| JP | H06-32248 U | 4/1994 |

(Continued)

OTHER PUBLICATIONS

Russian Office Action, with English translation, issued in Russian Patent Application No. 2008 148 166, Aug. 20, 2010.

(Continued)

*Primary Examiner* — Eric A Gates
*Assistant Examiner* — Paul M Janeski
(74) *Attorney, Agent, or Firm* — McDermott Will & Emery LLP

(57) ABSTRACT

According to the invention, a drilling tool includes: a motor; a transmission drive unit for transmitting a rotation force of the motor to rotate a drill bit; and a dust collector for collecting dust produced from a workpiece drilled by the drill bit, wherein the dust collector is provided with a pierced portion pierced by the drill bit, a dust collection port for sucking the produced dust and its surrounding air, and a blowoff port for blowing air against a vicinity of the piercing drill bit.

13 Claims, 20 Drawing Sheets

(56) References Cited

FOREIGN PATENT DOCUMENTS

| | | | |
|---|---|---|---|
| JP | 6190679 A | | 7/1994 |
| JP | 7156136 A | | 6/1995 |
| JP | 09285939 A | * | 11/1997 |
| JP | 10315094 A | * | 12/1998 |
| JP | 2003089032 A | * | 3/2003 |
| JP | 2004 276194 | | 10/2004 |
| JP | 2005/028471 A | | 2/2005 |
| JP | 2005/131716 A | | 5/2005 |
| JP | 2005297318 A | * | 10/2005 |
| JP | 2006 088285 | | 4/2006 |

OTHER PUBLICATIONS

Japanese Office Action, and English translation thereof, issued in Japanese Patent Application No. 2007-316696 dated Jun. 26, 2012.

* cited by examiner

DRILLING TOOL WITH DUST COLLECTOR

CROSS-REFERENCE TO RELATED APPLICATIONS

This application is based upon and claims the benefit of priority from Japanese Patent Application No. 2007-316696 filed Dec. 7, 2007, and Japanese Patent Application No. 2008-087292 filed Mar. 28, 2008, the entire contents of which are incorporated herein by reference.

BACKGROUND

1. Field

The present invention relates to a drilling tool for drilling a hole which is driven by an electric motor, an engine, or the like and, particularly, relates to a drilling tool with a dust collector which allows effective collection of dust produced during drilling.

2. Description of the Related Art

A drilling tool is used to drill a hole in stone materials such as a concrete and a brick. The drilling tool drills a hole in a workpiece by driving a drill bit, and includes a general rotary drill, a hammer drill which causes the drill bit to rotate and strike, a vibratory drill, or the like. Since dust is produced when a drilling operation is performed by using the drilling tool, an operator may perform the operation with a dust mask, protective glasses, or the like. In recent years, a drilling tool provided with a dust collector which sucks the dust has been widely used to remove the dust produced during the operation.

For example, JP-A-2004-276194 discloses that an entire drill bit is covered with a bellows member and a dust collection box in a main body of a vibratory drill, and the main body of the vibratory drill is connected to a suction dust collector as a separate device by means of a connecting pipe of the dust collection box. With this method, the entire drill bit is covered with the bellows member and the dust collection box so that high dust collection effect can be expected. However, large-sized bellows member and dust collection box are required, and the suction dust collector as the separate device is also required so that the method lacks portability.

On the other hand, as a drilling tool having a dust collector which is reduced in size, there is a technique disclosed in JP-A-2006-88285. In the technique, a fluid through passage is formed along a shaft center from a rear end of a drill bit, a fluid discharge port communicated to the outside of the drill is formed at a flute portion at the end of the fluid through passage, and compressed air is delivered to the vicinity of the tip end portion of the drill bit by a compressor provided in the outside via the fluid through passage and the fluid discharge port. A dust collection cup is provided in the vicinity of the tip end portion of the drill bit, and dust is sucked by a suction fan which is rotated by a motor of the drilling tool via a pipe. Even in this device, the compressor as an external device is required so that the device lacks portability. In addition, since the device has a special structure in which the fluid through passage is formed in the shaft center portion of the drill bit, the cost is increased.

In order to solve the problem related to the portability described above, it can be considered that, from the technique disclosed in JP-A-2006-88285, the liquid through passage is removed and the connection to the external compressor is omitted, or the device is used without operating the compressor so that the portability is improved. In this case, dust produced during a drilling operation is moved into a dust collection adaptor due to a spiral structure of the drill bit, guided to a dust collection passage by the suction force of the dust collection fan, separated into air and dust by a filter in a dust collection case, and the dust is stored in the dust collection case. During the drilling operation, the main body of the tool is moved toward a work piece, and a dust collection slide portion constructed of a slide pipe a dust collection unit also move with the movement of the main body of the tool so that it becomes possible for the dust collection adaptor to be constantly in contact with the workpiece.

However, there has been a case where the dust is not sufficiently sucked and the dust is leaked from the vicinity of a contacting area of the dust collection adaptor and the drill bit so that an operator has to spend extra time and effort.

The dust produced during the drilling operation is moved into the dust collection adaptor due to the spiral structure of the drill bit and collected by the suction force of the dust collection fan. However, there has been a case where a part of the dust remains inside the drilled hole after the drilling operation, the remaining dust needs to be removed when an anchor or the like is driven into the drilled hole, and the dust is disadvantageously blown off during the operation for removing the dust. In particular, in the drilling operation with the drill bit faced downwardly as well as the drilling operation with the drill bit held laterally, there has been a case where the dust tends to remain inside the drilled hole or in the surrounding area thereof due to the influence of gravity, and the removal operation of the remaining dust requires extra time and effort.

An object of the present invention is to provide a drilling tool having a dust collector which is increased in dust collection efficiency, improved in workability, and reduced in size.

SUMMARY OF THE INVENTION

The foregoing object can be achieved by adopting the structure described hereinbelow in a drilling tool having a motor, a transmission drive unit for transmitting a rotation force of the motor to rotate a drill bit (an end tool), and a dust collector for collecting dust produced from a workpiece drilled by the drill bit.

The dust collector is provided with a pierced portion pierced by the drill bit, a dust collection port for sucking dust produced in the vicinity of the tip end of the drill bit and air in the surrounding area, and a blowoff port for blowing air against the vicinity of the piercing drill bit. In addition, the amount of the air sucked from the dust collection port is adjusted to be larger than that of the air blown from the blowoff port. The optimum value of the ratio may be determined in accordance with various factors such as the quality of a workpiece to be drilled, the diameter of the drill bit, the rotation speed thereof, and the like.

In the motor of the drilling tool, a fan for collecting dust is newly provided or the existing cooling fan is arranged to perform the function. Both of the suction from the dust collection port and the airflow for a blowing operation to the blowoff port may be generated by the rotation force of the fan. The dust collector is provided with a retractable duct having a passage extending from the dust collection port to the fan via a dust collection filter and a passage extending from the fan to the blowoff port. The two passages provided in the retractable duct are disposed coaxially or side by side. A part of the air from the dust collection port sucked by the fan is returned to the blowoff port and the rest of the air is discharged to the outside of the drilling tool. The retractable duct is formed of a fixed portion and a retractable portion, is attached generally in parallel with a longitudinal direction of the drill bit, and is retractable in the longitudinal direction.

As for the direction of the airflow blown from the blowoff port, either one of the circumferential direction of the pierced portion of the dust collector, which is the direction toward the central portion, and the direction generally in parallel with the axial direction of the drill bit, or the combination of both directions may be used.

A housing is connected to the retractable duct, a dust collection case is detachably set in the housing, and a filter is detachably attached in the dust collection case. It is to be noted that the entire dust collector may be detachable from the drilling tool.

The shape of the pierced portion is cylindrical and a shutter member for limiting the passage of air between the drill bit and the pierced portion is provided at one end side of openings of the pierced portion. As the passages in the vicinity of the pierced portion, the passage extending to the blowoff port and the passage extending from the dust collection port are disposed side by side in a left-to-right direction when viewed from the longitudinal direction of the drill bit.

In accordance with the present invention, since a blowing means for blowing the air is provided in addition to a suction port for sucking the air together with the dust in the dust collector, the dust can be effectively collected with limited suction force and the leakage of the dust to the outside of the dust collector can be effectively prevented.

According to an aspect of the present invention, there is provided a drilling tool including: a motor; a transmission drive unit for transmitting a rotation force of the motor to rotate a drill bit; and a dust collector for collecting dust produced from a workpiece drilled by the drill bit, wherein the dust collector is provided with a pierced portion pierced by the drill bit, a dust collection port for sucking the produced dust and its surrounding air, and a blowoff port for blowing air against a vicinity of the piercing drill bit.

According to another aspect of the present invention, there is provided a drilling tool which drills a workpiece by causing a drill bit to rotate or strike, including: a dust collector having a dust collection port for sucking air together with dust and a blowoff port for blowing the air against a vicinity of a tip end of the drill bit, and covering an outer periphery of a tip end portion of the drill bit; a dust collection case for storing the dust sucked from the dust collection port; and a fanning means for generating an airflow to be sucked and discharged.

According to another aspect of the present invention, there is provided a drilling tool including: a motor; a transmission drive unit for transmitting a rotation force of the motor to rotate a drill bit; and a dust collector for collecting dust produced from a workpiece drilled by the drill bit, wherein the dust collector is provided with a blowoff port for blowing air in an axial direction of the drill bit.

DETAILED DESCRIPTION

Figure 1:
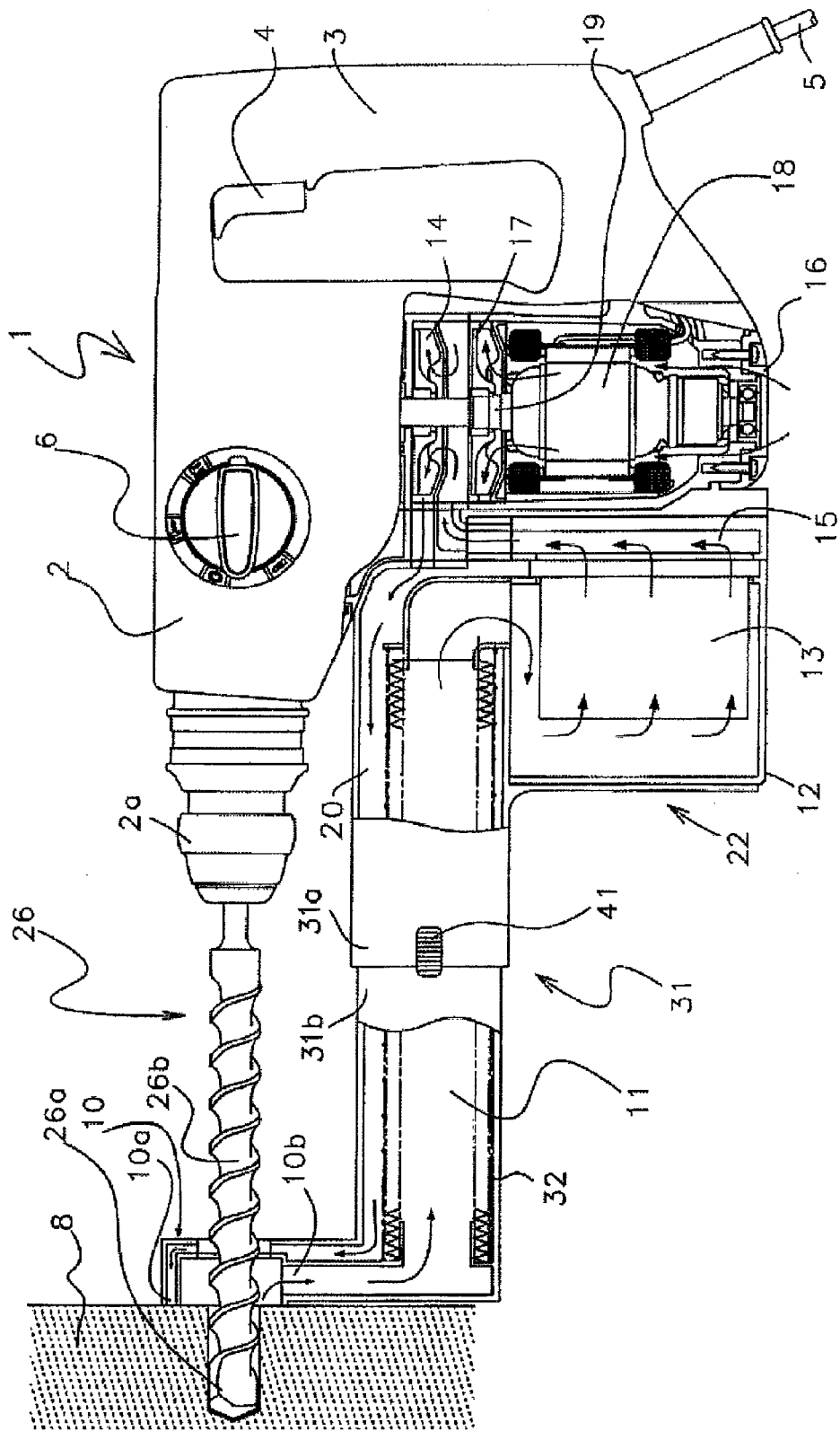
FIG. 1 is a cross-sectional view of a drilling tool according to a first embodiment of the present invention.
Figure 2:
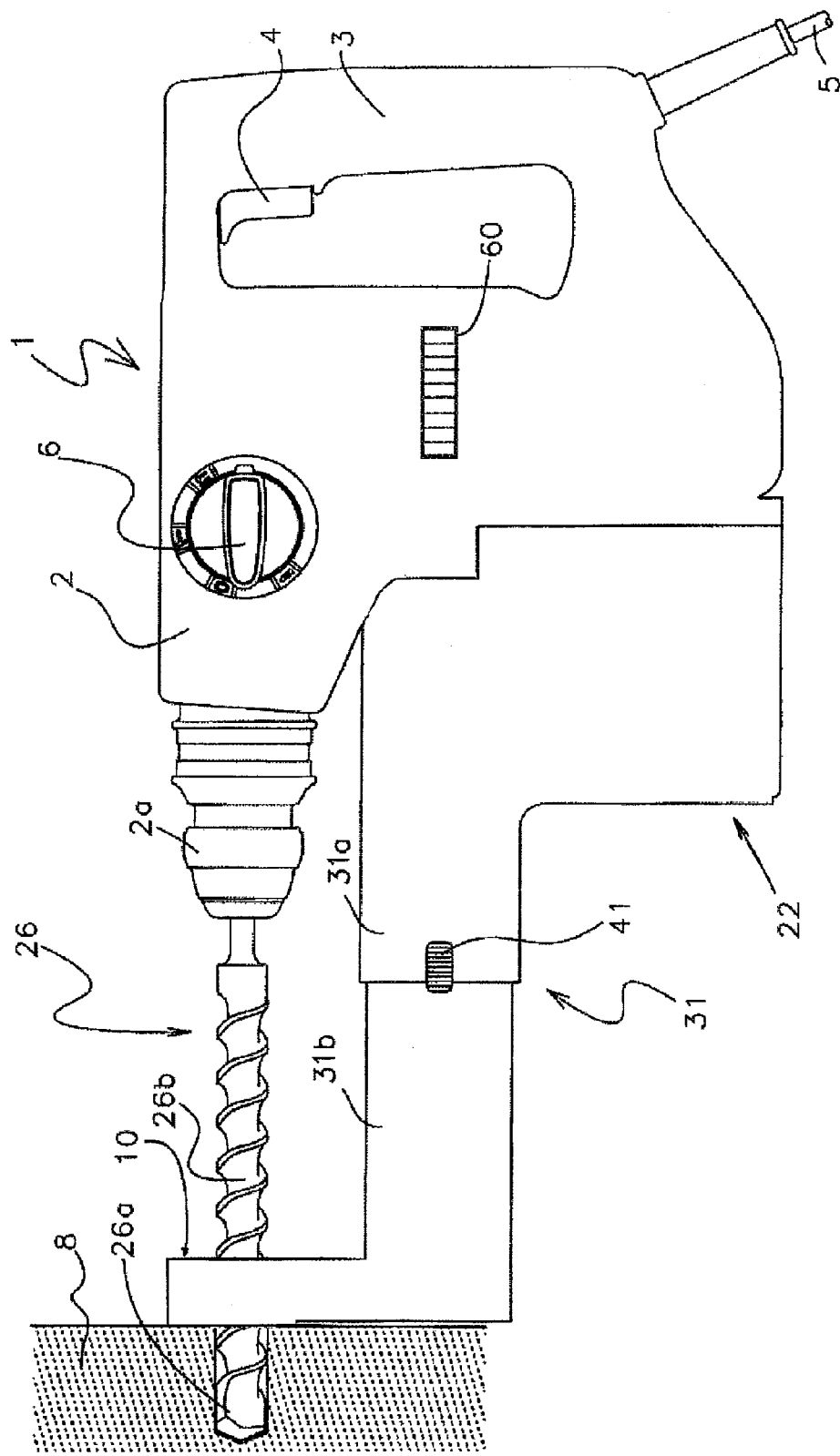
FIG. 2 is an overall view of the drilling tool of FIG. 1.

A drilling tool according to an embodiment of the present invention will be described hereinbelow with reference to FIGS. 1 and 2. FIG. 1 is a partial cross-sectional view of the drilling tool, while FIG. 2 is an external view thereof.

A hammer drill main body 1 has four modes as operational modes which are a rotation • strike mode, a rotation mode, a strike mode, and a neutral mode, and has a strike mechanism unit, a rotation transmission mechanism unit, and a switch mechanism unit which are not shown in a housing 2. A handle 3 is provided at a rear end portion (the right end part in FIG. 1) of the housing 2. The handle 3 is provided with a switch 4 and an electric cord 5 for supplying electricity is connected to the handle 3. On a side portion of the housing 2, a dial-shaped changeover switch 6 for changing the operational modes is provided. The four operational modes described above can be changed by the changeover switch 6. At a front end portion of the housing, a tool holding portion 2a is provided. A drill bit 26 is attached to the tool holding portion 2a and supplied with a striking force or a rotation force, or both of the forces to perform a required operation with respect to a workpiece 8.

In a drilling operation with respect to the workpiece 8, an operator holds the handle 3 of the hammer drill 1 and operates the switch 4 to drive a motor 18. As a result, the rotation force of the motor 18 is transmitted to cause the drill bit 26 attached to the tip end portion of the hammer drill main body 1 to rotate and strike. The operator holds the handle 3 of the hammer drill main body 1 and pushes the hammer drill 1 against the workpiece 8 so that the drill bit 26 crushes the workpiece 8 to produce a drilled hole in the workpiece 8.

The drill bit 26 has a tip end portion 26a for crushing the workpiece 8 and a spiral portion 26b having the function of moving dust produced by crushing the workpiece 8 in the drilled hole. As shown in the drawings, the vicinity of the tip end portion of the drill bit 26 pierces a pierced portion of a dust collection adaptor 10 and reaches the workpiece 8. The length of the pierced portion as a pierced area corresponds to a partial portion of the total length of the drill bit 26.

During the rotation • strike mode operation, the dust produced from the tip end portion 26a of the drill bit 26 is guided into the dust collection adaptor 10 due to the rotation of the drill bit 26 and the configuration of the spiral portion 26b, guided from a dust collection port 10b to a dust collection passage 11 by an airflow as indicated by an arrow caused by the suction force of a dust collection fan 14 provided on a rotary shaft 19 of the motor 18, separated into air and the dust by a filter 13 in a dust collection case 12 provided in a housing 22 of the dust collector, and the separated dust is stored in the dust collection case 12. The dust collection case 12 is detachable in the housing 22, and the dust stored in the dust collection case 12 can be disposed of when the dust collection case 12 is detached.

On the other hand, the separated air passes through an air passage 15 and reaches a dust collection fan 14. A part of the air flown into the dust collection fan 14 is discharged from a first discharge port 60 (shown in FIG. 2) to the outside of the hammer drill main body 1 and the rest of the air is flown into the dust collection adaptor 10 again. The detail of the structure will be described later. The airflow of the air flown into the dust collection adaptor 10 again is utilized when the air is blown against the pierced portion of the dust collection adaptor.

The motor 18 is provided as a power source for driving the drill bit 26 in the interior of the hammer drill main body 1. When the drill bit 26 is driven, the motor 18 rotates and, at the same time, generates heat. In order to restrain the heat generation of the motor 18, a cooling fan 17 is provided on the rotary shaft 19 of the motor 18. Cooling air is sucked from a cooling air intake port (not shown) provided in a tail cover 16 by the suction force of the cooling fan 17 and the cooling air cools the motor 18 in a manner indicated by the arrow. The cooling air reaches the cooling fan 17 after having cooled the motor, and is discharged from a discharge port which is not shown to the outside of the hammer drill main body 1.

The dust collection adaptor 10 is held by a slider portion 31 attached to the hammer drill main body 1 so as to be in contact with the workpiece 8 in the vicinity of the drill bit 26. The slider portion 31 has a fixed pipe 31a, a slider pipe 31b, and a spring 32, and the dust collection passage 11 functioning as a retractable duct is formed of these components. The spring 32 is provided between the fixed pipe 31a and the slider pipe 31b, and biases the fixed pipe 31a and the slider pipe 31b in such a direction that they are moved apart from each other. As a result, the dust collection adaptor 10 connected to the slider pipe 31b is biased in a direction toward the workpiece 8. The slider portion 31 is also capable of controlling the movement of the slider pipe 31b to fix it at an optional retracted position by means of a lock 41.

During the operation in the rotation • strike mode, when the drilled hole is produced, the hammer drill main body 1 moves toward the workpiece 8 as the drilled hole becomes deeper. A structure is adopted in which, with the movement of the hammer drill main body 1 toward the workpiece 8, the spring 32 is compressed and a part of the slider pipe 31b is moved into the interior of the fixed pipe 31a so that the slider portion 31 is retracted and the dust collection adaptor 10 is constantly in contact with the workpiece 8. At that time, the slider portion 31 is held to be generally in parallel with the longitudinal direction of the drill bit 26, and the dust collection adaptor 10 is moved in the axial direction of the drill bit 26 relative to the hammer drill main body 1. Thus, since the retractable duct as the slider portion 31 is structured to be retractably provided, the length of the slider portion 31 can be adjusted to be the length in the longitudinal direction in accordance with the depth of the drilled hole, and dust collection in accordance with the depth of the drilled hole can be performed.

The dust produced during the drilling operation is moved into the dust collection adaptor 10 due to the spiral structure 26b of the drill bit 26. Then, by means of the dust collection fan 14, the dust and air are moved from the dust collection adaptor 10 to the dust collection passage 11. Thereafter, by means of the filter 13 provided in the dust collection case 12, the dust is stored in the dust collection case 12, while only the air filtered by the filter 13 is moved to the air passage 15. It is to be noted that the filter 13 is detachable from the dust collection case 12 though details are not shown in the drawings. Accordingly, the lower portion or side portion of the housing 22 of the dust collector may be constructed in an opened state, or may be openably constructed. Thus, a structure is adopted in which the dust collection case 12 is detachable from the dust collector so that the dust stored in the dust collection case 12 can be easily disposed of. In addition, a structure is adopted in which the filter 13 is detachable from the dust collection case 12 so that the filter 13 can be easily exchanged in the case where the filter 13 is, e.g., clogged or the like.

As for the air moved into the air passage, a part of the air is discharged to the outside of the main body via the discharge port 60 (shown in FIG. 2) and the rest of the air is returned to the dust collection adaptor 10 by means of the dust collection fan 14. The air to be returned is moved into a guide passage 20. The guide passage 20 is provided above the dust collection passage 11 inside the slider portion 31.

The air which has passed through the guide passage 20 passes through an end (on the side with the main body 1) of the dust collection adaptor, and is guided to a blowoff port 10a in the upper portion of the dust collection adaptor 10. The blowoff port 10a is formed in the dust collection adaptor 10. By means of the blowoff port 10a, clean air is blown against the tip end of the drill bit 26 and/or the vicinity of the workpiece 8. Thus, the air can be blown against the vicinity of the tip end of the drill bit 26 so that it is is possible to effectively float remaining dust and collect the dust with relatively low suction force, and further restrain the leakage of the dust to the outside of the dust collection adaptor 10.

In addition, since the blowoff port 10a is formed in the dust collection adaptor 10, it is not necessary to add another member as a blowing means in addition to the dust collection adaptor 10. Further, since the air used during the blowing operation is generated by the dust collection fan 14 used for collecting dust, it is not necessary to newly add an air blower such as a fan for blowing air. Furthermore, since the air used for the blowing operation passes through the guide passage 20 provided inside the slider portion 31, it is not necessary to provide an additional member for causing the air used for the blowing operation to move in addition to the slider portion 31.

Thus, in accordance with the present embodiment, it is possible to restrain an increase in the number of components and to implement a drilling tool having an economical dust collector.

Figure 3:
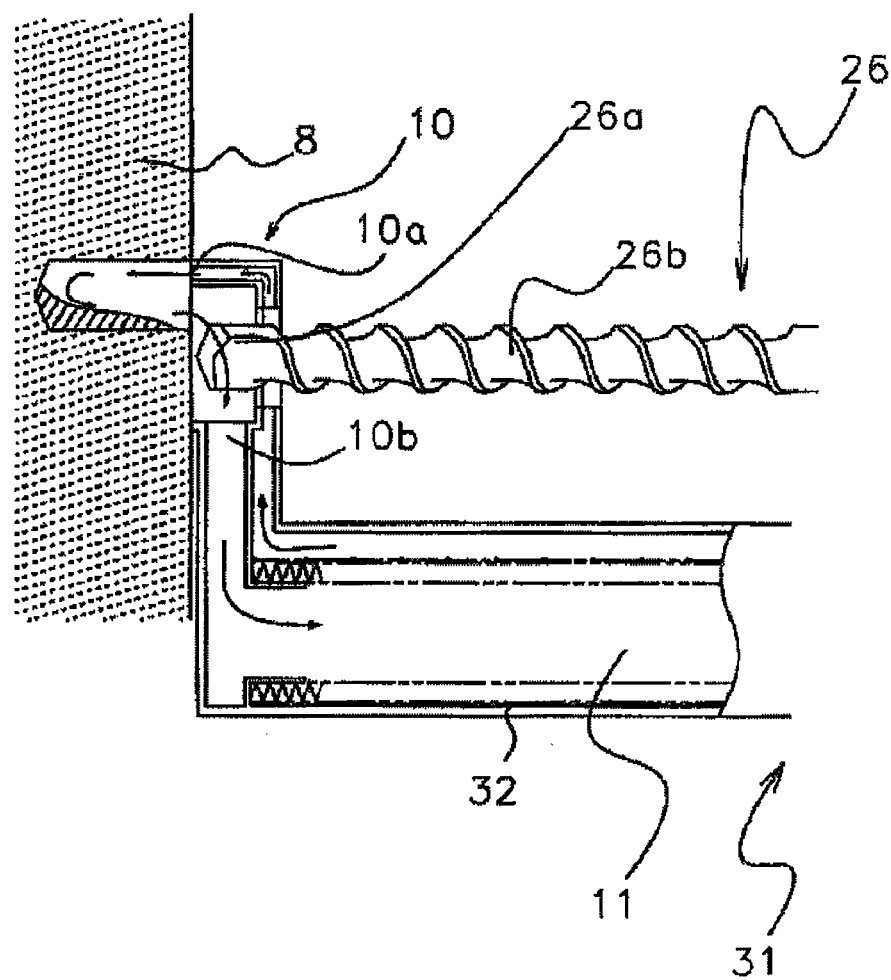
FIG. 3 is a view for illustrating a drilling operation by the drilling tool of FIG. 1.

Although the first embodiment of the present invention has been described thus far, various applications and modifications may be made in the embodiment. FIG. 3 shows an example of the modification. The operator withdraws the drill bit 26 from a drilled hole 8a after the production of the drilled hole 8a. Next, the blowoff port 10a of the dust collection adaptor 10 is moved close to the drilled hole 8a such that its center axis is positioned in the drilled hole 8a. Then, when the motor 18 is driven by operating the switch 4, the air blown from the blowoff port 10a flows into the drilled hole 8a which is opened in the axial direction of the drill bit 26, blows the remaining dust out of the drilled hole 8a, and guides the remaining from the dust collection port 10b to the dust collection passage 11. With this operation, it becomes possible to favorably remove the dust remaining in the drilled hole.

As for the amount of the air moved to the dust collection case 12 and the amount of the air blown from the blowoff port 10a, favorable dust collection effect can be obtained when the latter is adjusted to be smaller. With this adjustment, it becomes possible to suck an almost total amount of the air blown from the blowoff port 10a, and to effectively prevent the remaining dust from being blown out to the outside since even the air in the surrounding area is sucked as well.

Figure 4:
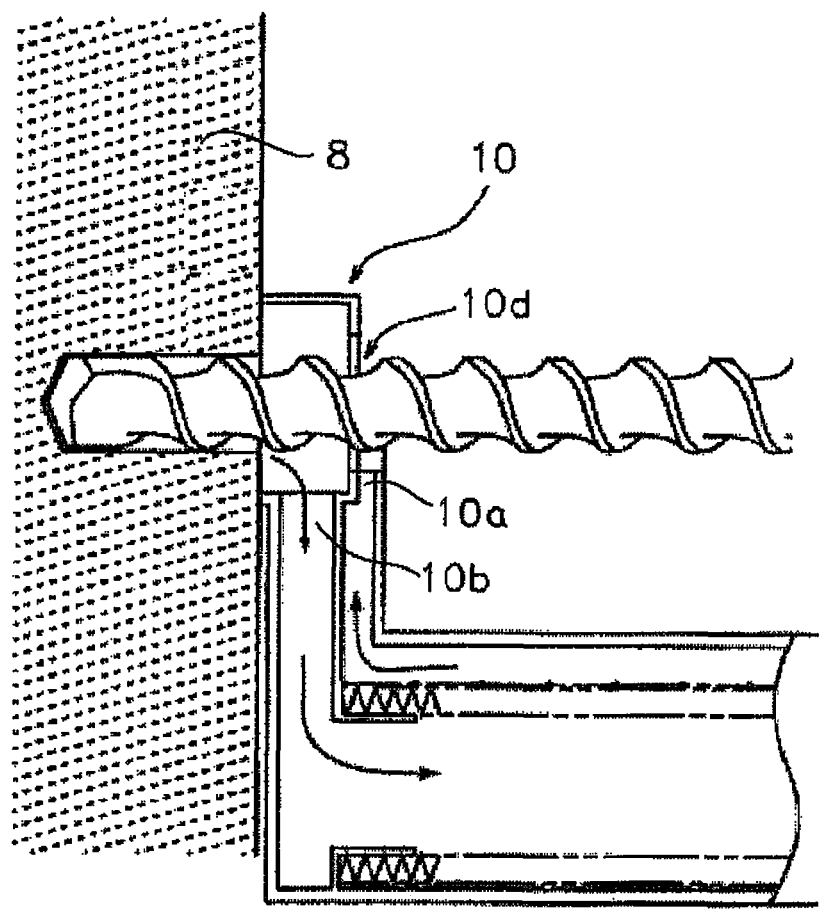
FIG. 4 is a partial view showing a variation of the first embodiment of the present invention.

FIG. 4 shows another variation. In FIG. 4, a structure is adopted in which the blowoff port 10a blows the air against the vicinity of a pierced portion 10d of the dust collection adaptor 10. When the structure is adopted in which the air is blown against the vicinity of the pierced portion 10d of the dust collection adaptor 10, the leakage of the dust from the vicinity of the pierced portion 10d can be restrained.

Figure 5:
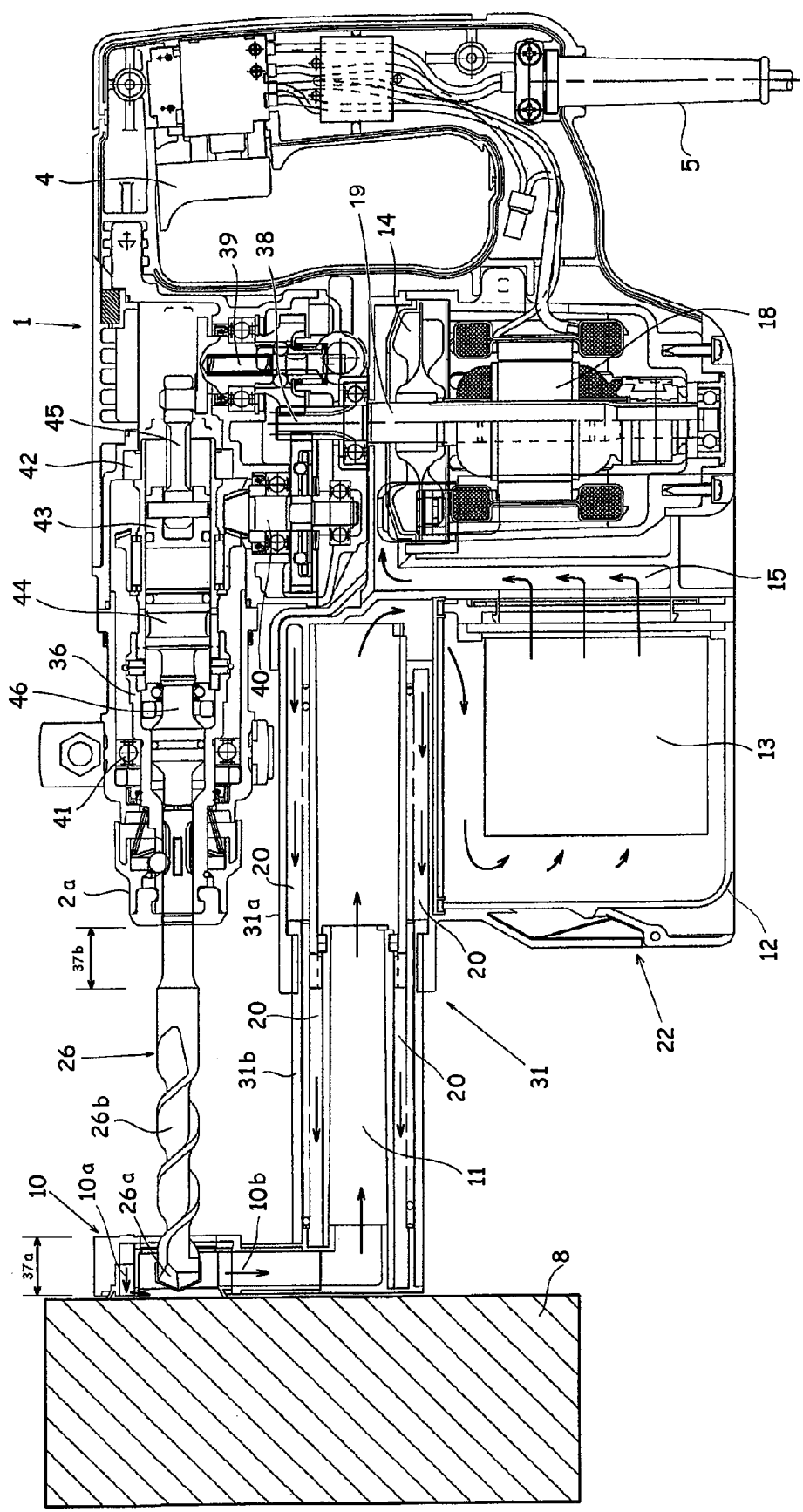
FIG. 5 is a cross-sectional view of a drilling tool according to a second embodiment of the present invention.

Next, a drilling tool showing a second embodiment of the present invention will be described by using FIGS. 5 to 12. FIG. 5 shows an overall view of a drilling tool having a dust collector. Portions which are the same as those shown in FIG. 1 are designated by the same reference numerals, and their repeated descriptions will be omitted.

The housing 2 accommodates a motor portion, a cylinder portion, a handle portion, and a transmission drive unit. In the housing 2, the motor 18 as a driving source is vertically accommodated. At an upper end of an output shaft (motor shaft) 19 extending upwardly above the motor 18, a pinion 38 is integrally formed. On both sides of the output shaft 19 of the motor 18, a crankshaft 39 and an intermediate shaft 40 are vertically and rotatably supported, and gears are attached to the intermediate height positions of the crankshaft 39 and the intermediate shaft 40. These gears are engaged with the pinion 38 described above which is formed at the end portion of the motor shaft 19.

In the upper portion of the housing 2, a cylinder 36 is rotatably supported at both end portions in its axial direction by a ball bearing 41 and a metal bearing 42, and is horizontally disposed. A piston 43 and a striker 44 are slidably fit into the cylinder 36. The piston 43 is coupled to a crankpin of the crankshaft 39 via a connecting rod 45, and one end of the connecting rod 45 is coupled to the piston 43 via a piston pin.

Rotation of the crankshaft 39 is converted into reciprocation of the piston 43 in a fore-and-aft direction in the cylinder 36 by the crankpin and the connecting rod 45, and the internal pressure of an air chamber is fluctuated by the reciprocation of the piston 43. As a result, the fluctuation in the internal pressure causes the striker 44 to reciprocate in the fore-and-aft direction in the cylinder 36 and intermittently impact against an intermediate member 46 so that a striking force is transmitted from the intermediate member 46 to the drill bit 26.

The gears, the crankshaft 39, the connecting rod 45, the cylinder 36, the piston 43, the striker 44, the intermediate member 46, and the like, which have been described above, constitute a strike mechanism unit, and the rotation of the output shaft 19 of the motor 18 is converted into the reciprocation of the piston 43 by the strike mechanism unit to provide the drill bit 26 with the striking force. The rotation force transmitted from the intermediate shaft 40 is transmitted to the cylinder 36 to cause simple rotation of the drill bit 26, and rotation portions including the intermediate shaft 40 constitute a rotation transmission mechanism unit. The strike mechanism unit and the rotation transmission mechanism unit can be simultaneously or selectively driven, and all or a part of the units constitute a transmission drive unit for rotating the drill bit.

FIG. 5 is greatly different from FIG. 1 in the disposition of the passages in the slider portion 31 constructed of the fixed pipe 31a and the slider pipe 31b. Although the dust collection passage 11 and the guide passage 20 are also formed in the slider portion 31 in FIG. 5, the locations thereof are different. In FIG. 1, these two passages are vertically disposed as shown in the drawing, while in FIG. 5, these passages are concentrically (the dust collection passage in an inner circle and the guide passage 20 in an outer circle) disposed. In addition, the cooling fan for the motor 18 is omitted in FIG. 5, and only the dust collection fan 14 is connected to the motor. Further, the disposition of the passage from the air passage 15 to the dust collection fan 14 and the guide passage 20 is also different. However, the practical effects obtained from the disposition of FIG. 1 and the disposition of FIG. 5 are not different.

Figure 6:
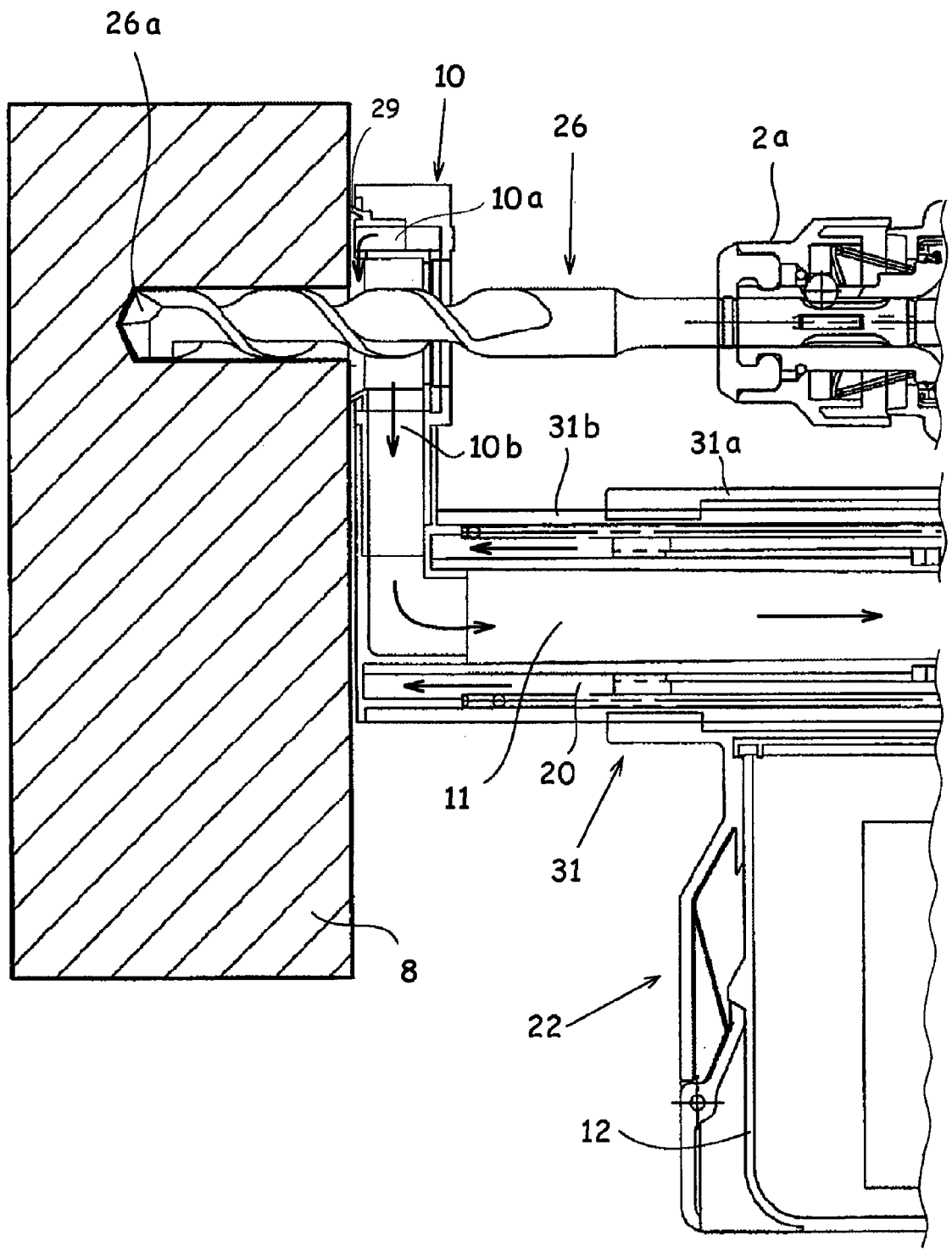
FIG. 6 is a view for illustrating a blowoff port 10a and a dust collection port 10b of the drilling tool of FIG. 5 and the direction of air flowing thereto.

FIG. 6 is a view for illustrating the blowoff port 10a and the dust collection port 10b of the drilling tool of FIG. 5 and the directions of the air flowing therethrough. The air discharged from the blowoff port 10a is bent by the workpiece 8 covering the blowoff port 10a in the axial direction and is flown toward the drill bit 26 (i.e., downward direction in FIG. 6). Since the large dust collection port 10b is disposed underneath, the dust produced or floated in the dust collection adaptor 10 is sucked from the dust collection port 10b. As for the flow rate of the air at each ports, for example, the suction flow rate is 0.3 m3/minute, while the blowoff flow rate is 0.04 m3/minute, and the ratio therebetween is 15:2. The optimum value of the ratio differs depending on various factors such as the quality of the workpiece 8 to be drilled, the diameter of the drill bit, the rotation speed, and the like. However, what is common to all cases is that, when the flow rate of the air sucked from the dust collection port 10b is adjusted to be larger than that of the air blown from the blowoff port 10a, the leakage of the dust can be effectively prevented. The ratio, which is the suction flow rate:the blowoff flow rate, can be set in the range from, e.g., 30:1 to 1:1.

The drill bit 26 is disposed between the blowoff port and the dust collection port. With this disposition, the air blown from the blowoff port 10a is collected by the dust collection port 10b after hitting against the drill bit 26, and the air blown from the blowoff port 10 is able to blow off the dust adhering to the drill bit 26, whereby the dust can be effectively collected. Further, a seal portion 29 which slightly protrudes from the dust collection adaptor 10 and is opened in the shape of a cup is formed on the periphery of the pierced portion on the tip end side (the side with the workpiece 8 in the axial direction of the drill bit) of the dust collection adaptor 10. With this formation, the leakage of the dust from the gap between the dust collection adaptor 10 and the workpiece 8 can be effectively prevented.

Figure 7:
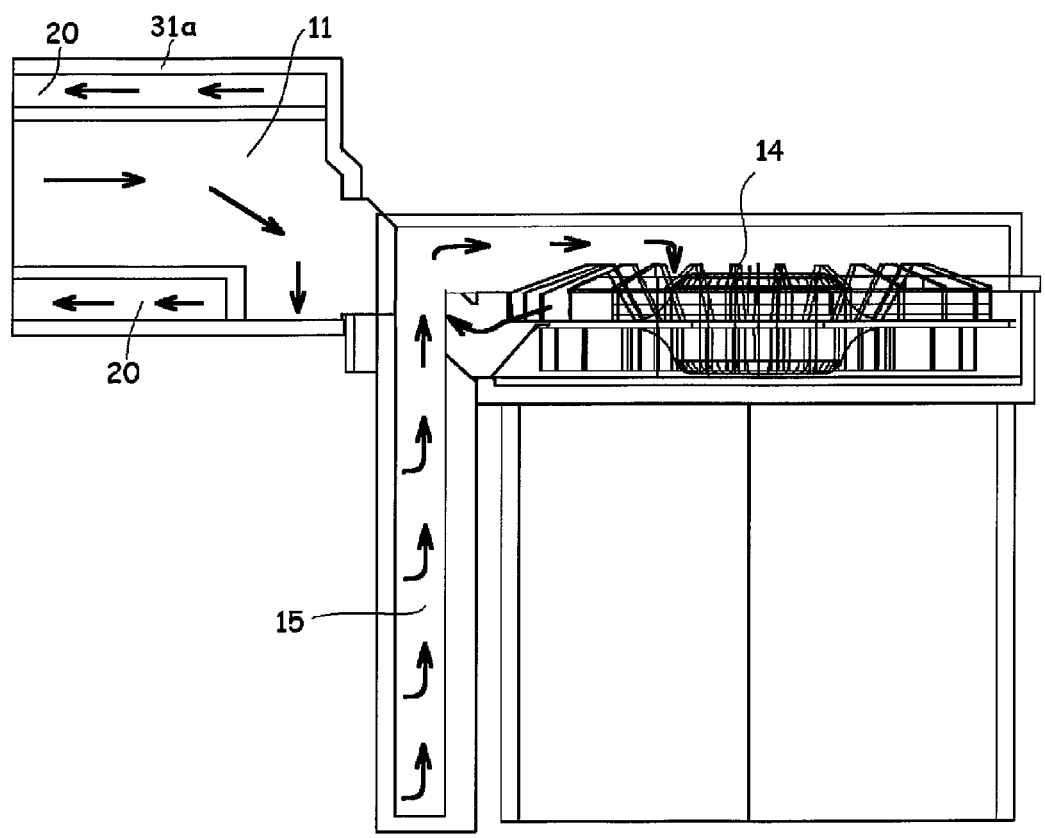
FIG. 7 is a schematic view for illustrating an airflow in the vicinity of a dust collection fan 14 of FIG. 5 (longitudinal sectional view)
Figure 8:
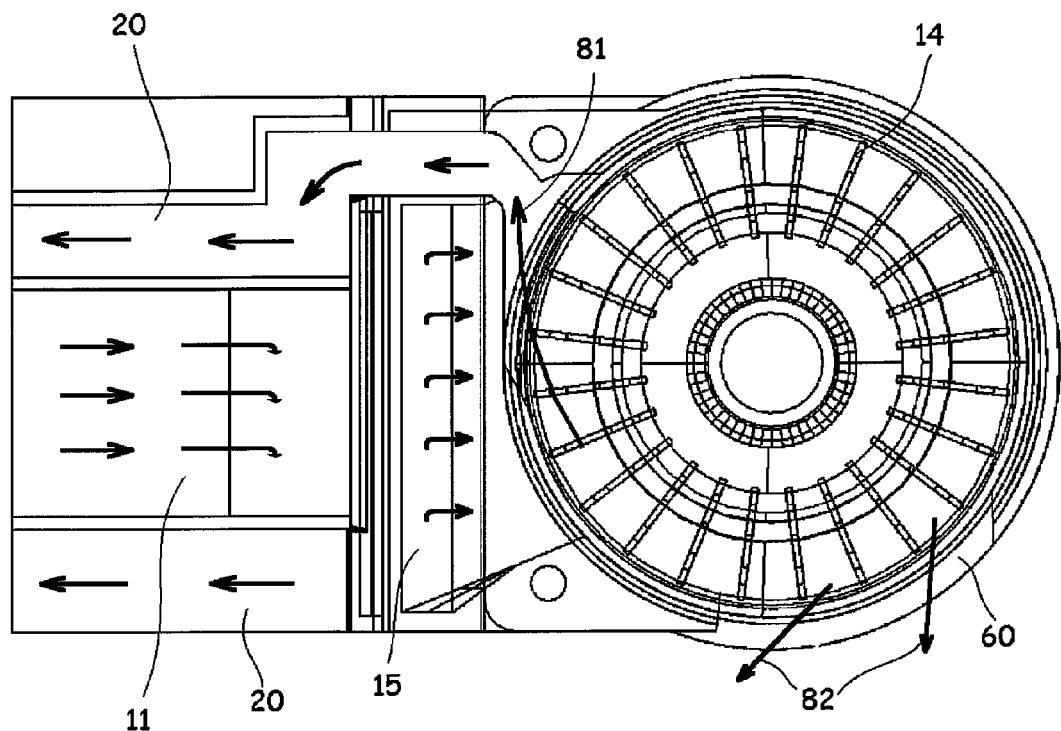
FIG. 8 is a schematic view for illustrating the airflow in the vicinity of the dust collection fan 14 of FIG. 5 (lateral sectional view)

FIGS. 7 and 8 are views for illustrating the flow of the air in the vicinity of the dust collection fan 14. FIG. 7 is a longitudinal sectional view, while FIG. 8 is a lateral sectional view, and they are partially schematic views for the illustration. In FIG. 7, the dust collection fan 14 is a centrifugal fan which sucks clean air guided from the air passage 15 from the upper surface of the dust collection fan 14 and discharges the air in an outer circumferential direction. A part of the discharged air is guided to the guide passage 20. FIG. 8 is the lateral sectional view illustrating the part of the discharged air guided to the guide passage 20. The air flowing in the dust collection passage 11 flows toward the direction of the filter 13 (the direction toward the back side of the page with FIG. 8). The air which has passed through the filter 13 flows into the dust collection fan 14 through the upper portion thereof (the front side of the page with FIG. 8) via the air passage 15, and a part of the air is guided to the guide passage 20 along the flow indicated by an arrow 81 and the rest of the air is discharged from the discharge port 60 to the outside of the housing 2 as shown by an arrow 82. Thus, by allocating different destinations to the air to be discharged from the dust collection fan 14, the ratio between the amount of the air sucked from the dust collection port 10b and the amount of the air blown from the blowoff port 10a can be determined. It is to be noted that, when a shutter member (not shown) is provided at an exit of the discharge port 60 and an opening area of the discharge port 60 is adapted to be variable, the ratio of the amounts of the air described above can be optionally changed.

Figure 9:
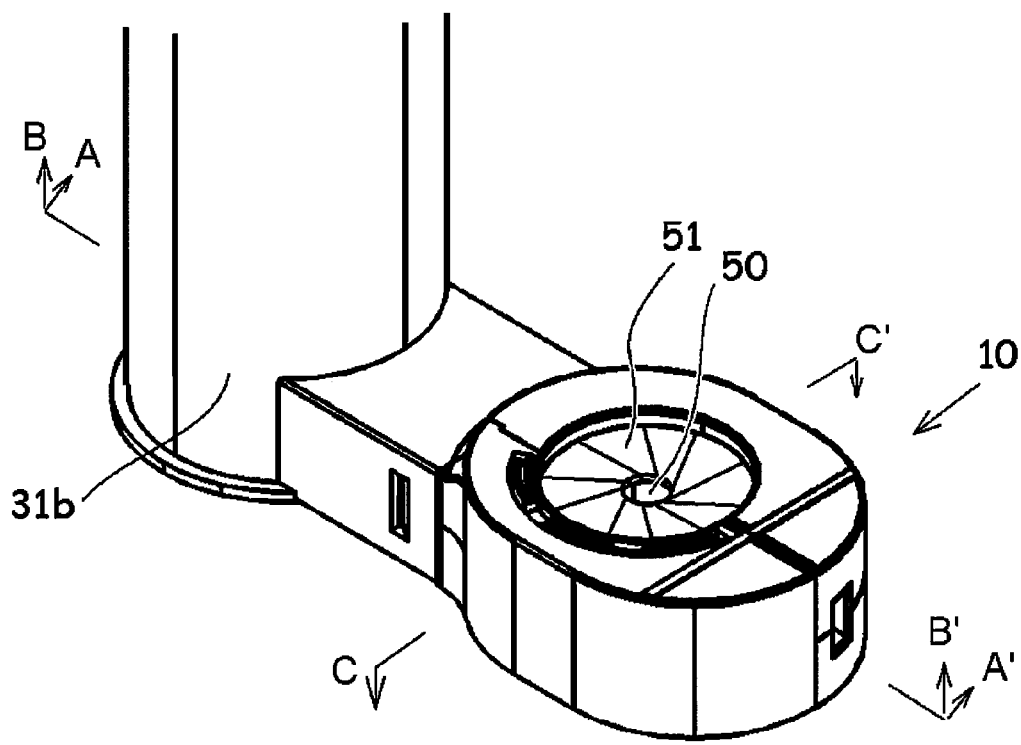
FIG. 9 is a perspective view showing the detail of a dust collection adaptor 10 of FIG. 5.

Next, by using FIGS. 9 to 12, the specific structure of the dust collection adaptor 10 of FIG. 5 will be described. FIG. 9 is a perspective view of the dust collection adaptor 10 when viewed from the side where the drill bit 26 is inserted. On one end side (the side with the hammer drill main body 1) of the pierced portion of the dust collection adaptor 10, a shutter 51 for limiting the passage of the air between the drill bit and the pierced portion is provided. As the material for the shutter 51, for example, rubber is used. However, the material is not limited thereto. Any material may be used as long as the material is resilient, does not obstruct the rotation of the drill bit 26 even when it comes into contact with the drill bit 26 which rotates at high speed, and is resistant to abrasion by the contact. The shutter 51 is constructed of ten thin pieces extending in a circumferential direction, and is in the shape of a diaphragm member. At the central portion of the shutter 51, an opening 50 is formed coaxially with the drill bit 26. The size of the opening 50 is preferably slightly larger than that of the drill bit 26. Thus, a structure is adopted in which the pierced portion is cylindrical and the shutter member for limiting the passage of the air between the drill bit and the pierced portion is provided on the one end side of the pierced portion so that the leakage of the dust from one end portion of the pierced portion can be restrained.

Figure 10:
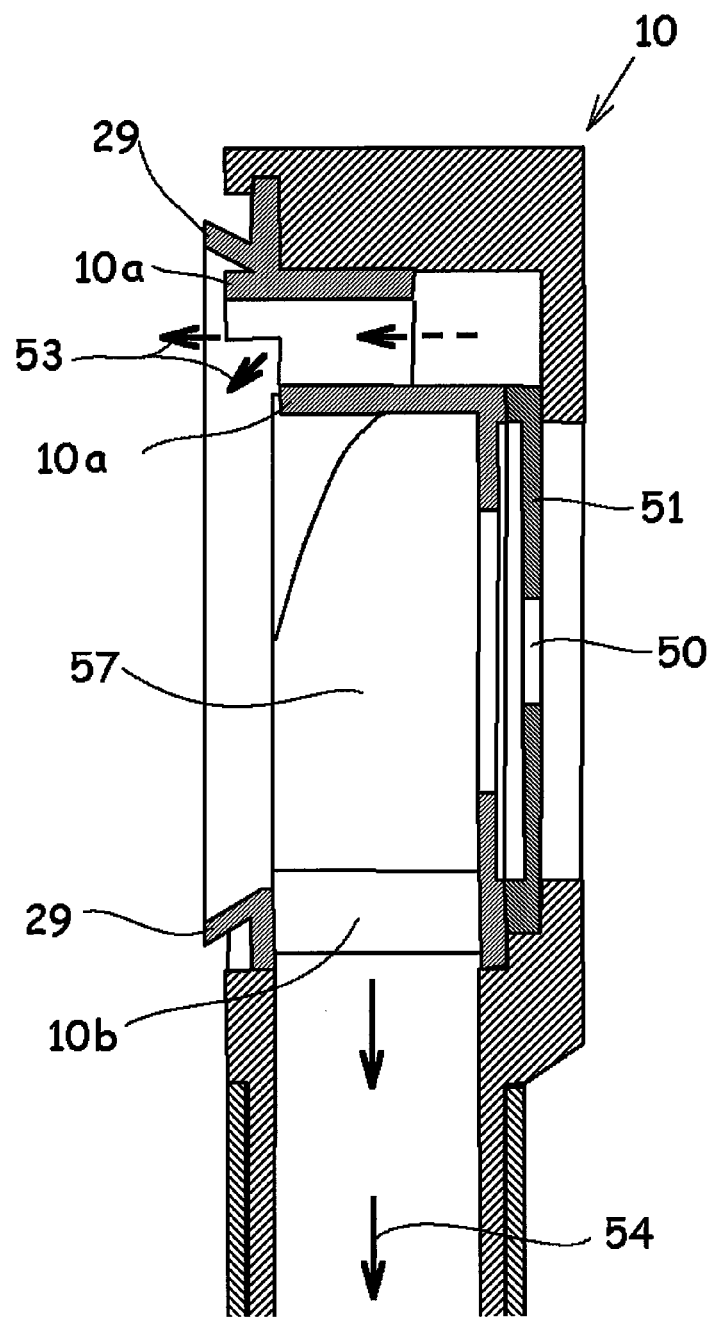
FIG. 10 is a cross-sectional view of an A-A' portion of FIG. 9.

FIG. 10 is a view showing a cross section of an A-A' portion of FIG. 9. The dust collection adaptor 10 is formed with the cylindrical blowoff port 10a for discharging the air to be blown, and guides the air in directions indicated by arrows 53 in the drawing. Out of the airflows indicated by the arrows 53, in order to generate the airflow in a downward direction (the direction toward the central portion of the pierced portion in the circumferential direction), a notch is provided in the lower side of the tip end portion (the lower-side portion at the left end in FIG. 10) of the blowoff port 10a. At the outer peripheral portion of the tip end of the pierced portion 57, the seal portion 29 is provided. The dust collection adaptor 10 can be formed of a plurality of plastic members. However, the member is not limited thereto. Most members may be integrally formed or manufactured by using other materials. Thus, since a structure is adopted in which the blowoff port 10a is provided and the notch is formed in the lower side of the tip end portion thereof, the air from the blowoff port is blown toward the drill bit 26 and the air blows off the dust adhering to the vicinity of the drill bit 26 so that dust collection can be effectively performed.

Figure 11:
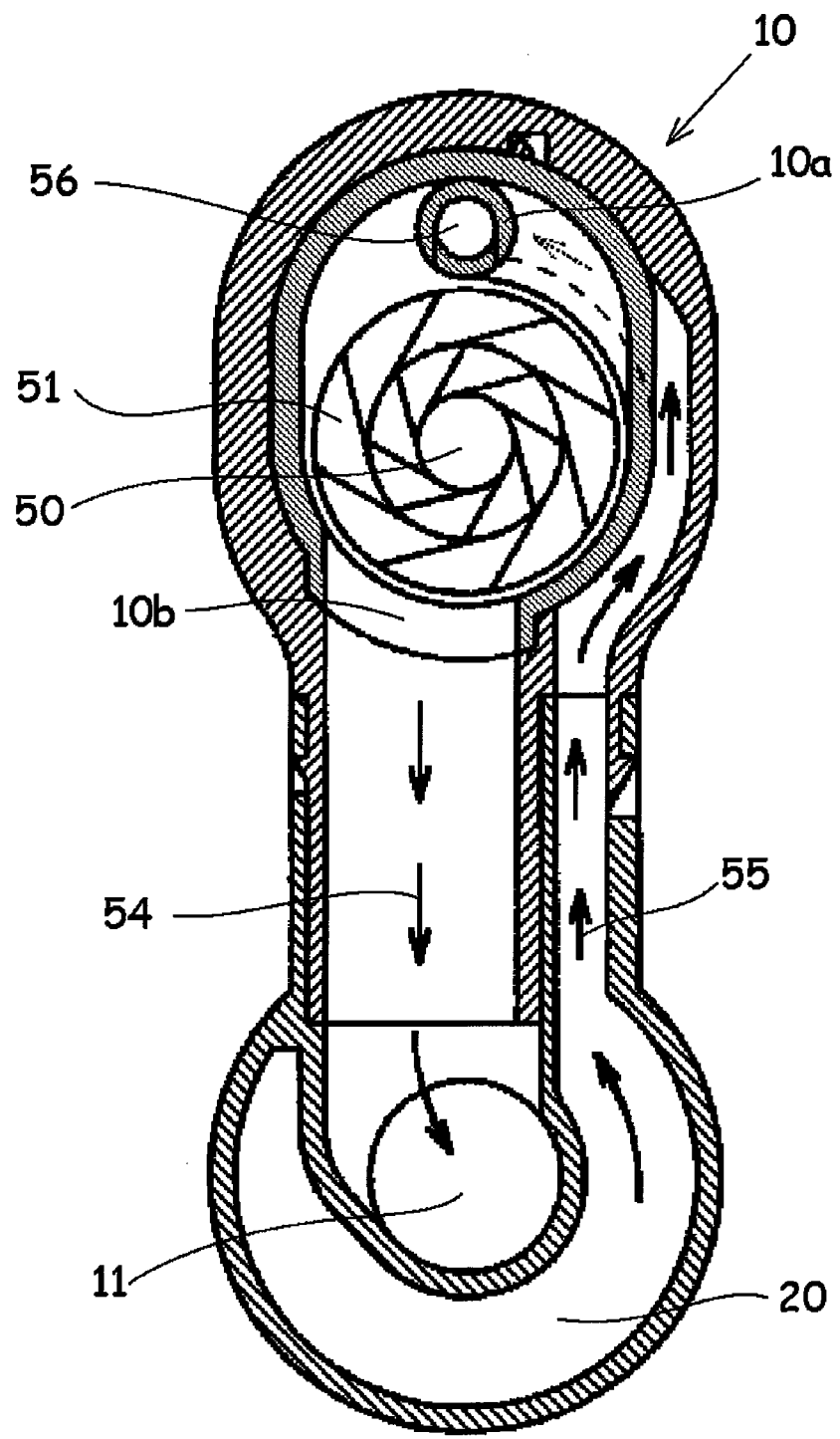
FIG. 11 is a cross-sectional view of a B-B' portion of FIG. 9.

FIG. 11 is a view showing a cross section of a B-B' portion of FIG. 9. The shutter 51 in FIG. 11 has a structure having a large diaphragm and a small diaphragm. However, it is optional whether or not this type of structure is adopted. Clean air guided from the guide passage 20 is flown in the direction indicated by an arrow 55 to be guided to the blowoff port 10a. The air containing dust sucked from the dust collection port 10b is flown in the direction indicated by an arrow 54 to be guided to the dust collection passage 11. When the dust collection passage 11 and the guide passage 20 are disposed in a left-to-right direction when viewed from the axial direction of the drill bit 26 instead of being disposed in a fore-and-aft direction (the disposition in FIG. 1), the thickness of the dust collection adaptor 10 (the portion indicated by 37a in FIG. 5) can be reduced. With the disposition in the fore-and-aft direction as shown in FIG. 1, there can be the case where it is difficult to dispose the passages for blowoff and suction which are sufficiently wide. However, with the disposition in FIG. 11, it is easy to secure the capacity of each passage.

As for the thickness of the dust collection adaptor 10 indicated by 37a in FIG. 5, when the thickness is reduced to be smaller than the thickness of the portion of the drill bit which is not spiral (the portion indicated by 37b in FIG. 5), deeper holes can be produced without the obstruction by the dust collection adaptor 10 so that workability is improved.

Figure 12:
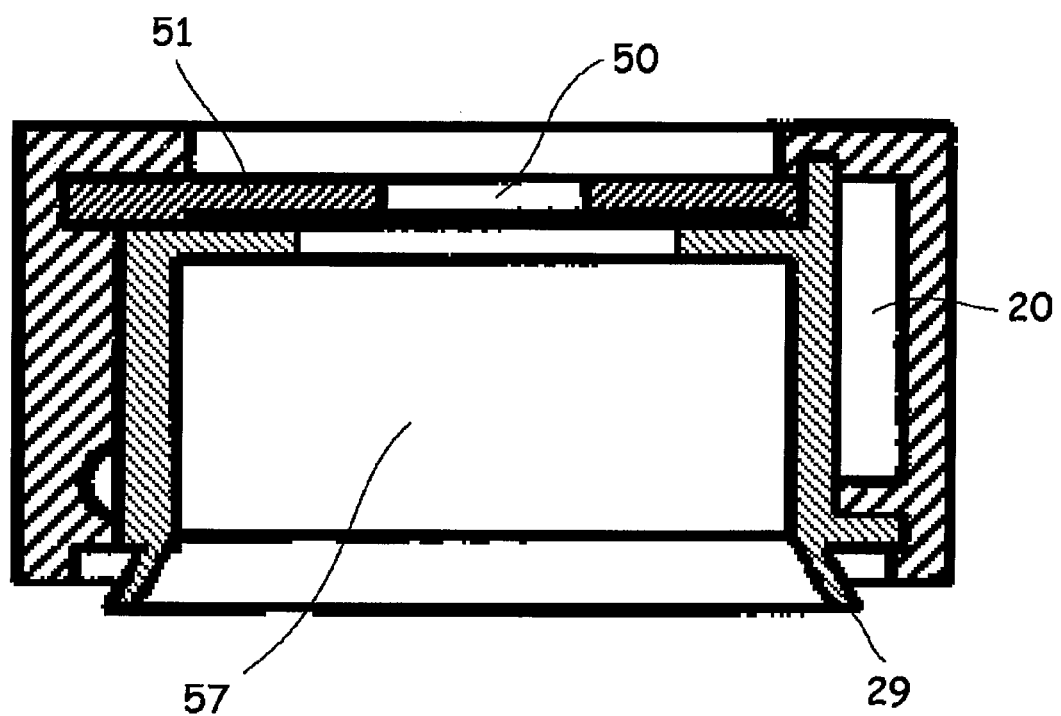
FIG. 12 is a cross-sectional view of a C-C' portion of FIG. 9.

FIG. 12 is a view showing a cross section of a C-C' portion of FIG. 9. As seen from the drawing, the guide passage 20 is formed on the outer peripheral side of the cylindrical pierced portion 57.

The present invention has been described thus far based on the first and second embodiments. However, the present invention is not limited thereto. Various modifications may be made without departing from the spirit and scope of the invention. For example, the disposition of the dust collection passage 11 and the guide passage 20 in the slider portion 31 and configurations of their cross-sectional areas may be optionally set. In addition, a structure may be adopted in which the guide passage 20 may be provided independently of the slider portion 31 instead of being provided in the slider portion 31.

Further, a structure is adopted in which electricity is supplied to the hammer drill by means of the electric cord 5 in the present embodiment. However, the supply of electricity may be performed by means of a rechargeable buttery, a solar buttery, a fuel buttery, and the like. In addition, the drilling tool has been described by using the hammer drill as an example in the present embodiment. However, the same effect is achievable in the case with the structures of other drilling tools such as a hammer, a drill, a vibratory drill, a driver drill, and the like as well.

Furthermore, a structure is adopted in which an electric motor is used to drive the dust collection fan in the present invention. However, in the case of a drilling tool using an internal combustion engine, the fan may be rotated by using the power thereof or an electric fan may also be rotated by using the electric power generated by the internal combustion engine.

Figure 13:
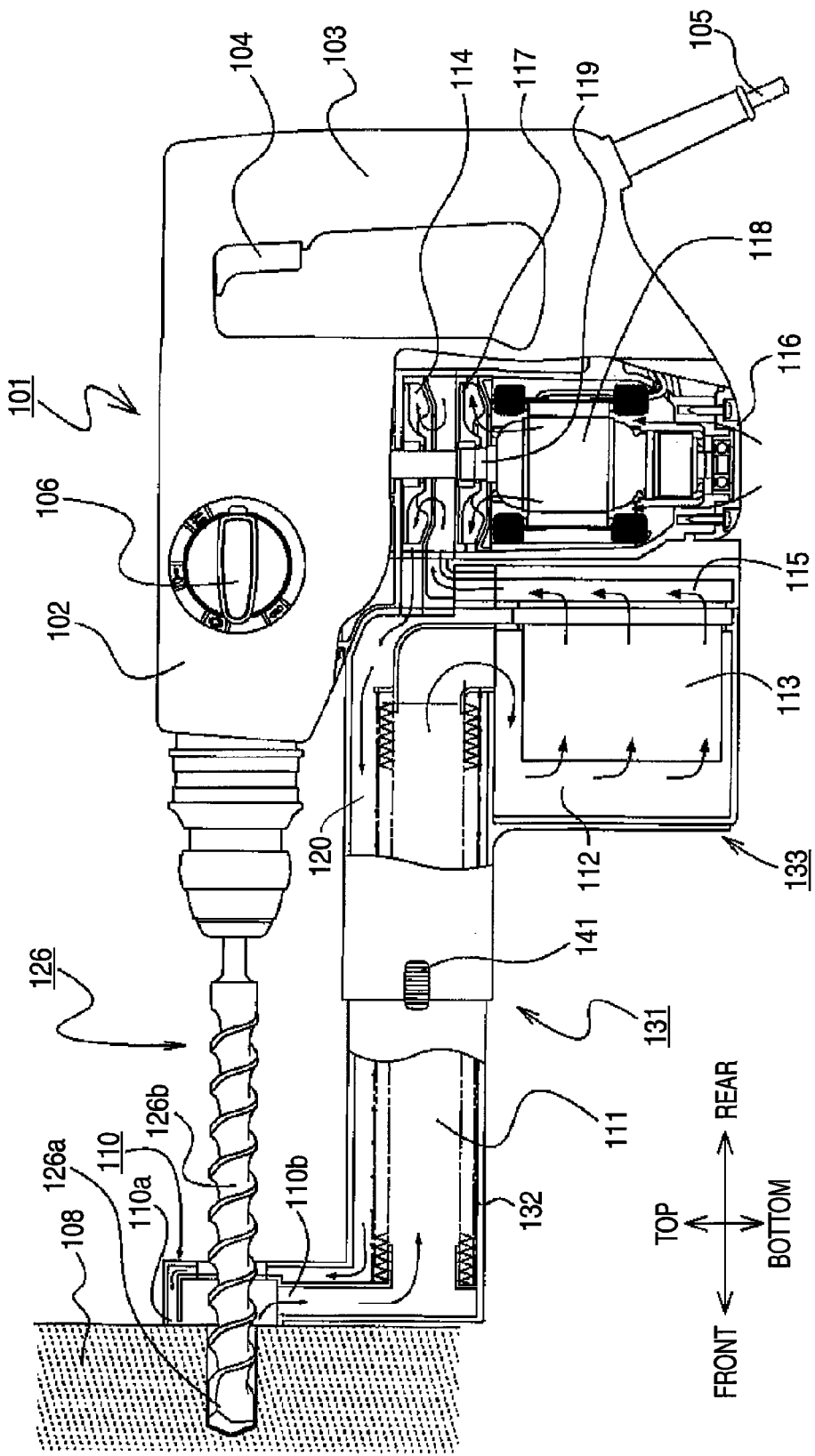
FIG. 13 is a side view of a drilling tool showing a third embodiment of the present invention and illustrating cross sections of only a dust collection portion and a motor portion.
Figure 14:
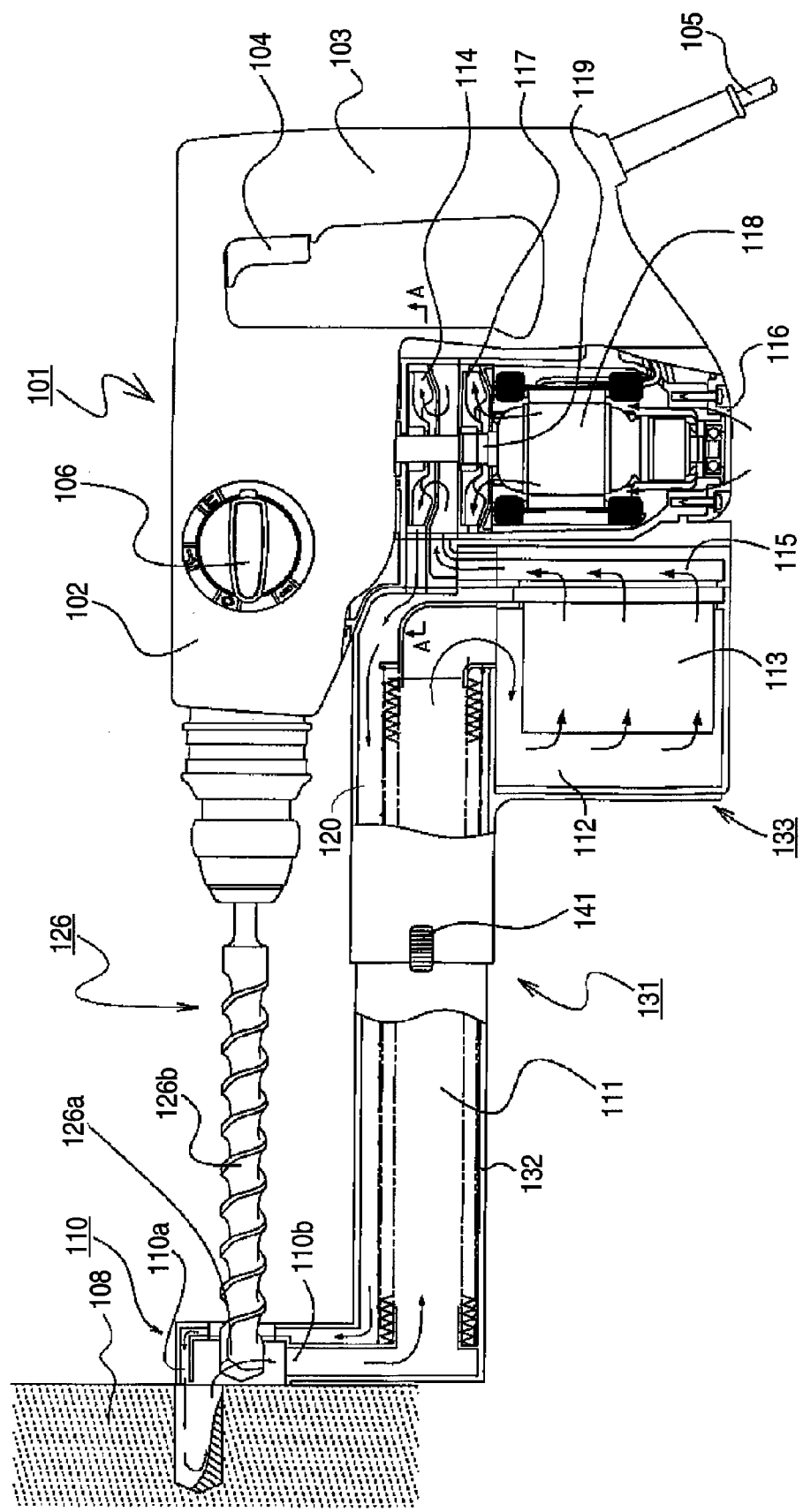
FIG. 14 is a side view showing the state of the drilling tool showing the embodiment of the present invention in use, and illustrating cross sections of only the dust collection portion and the motor portion.
Figure 15:
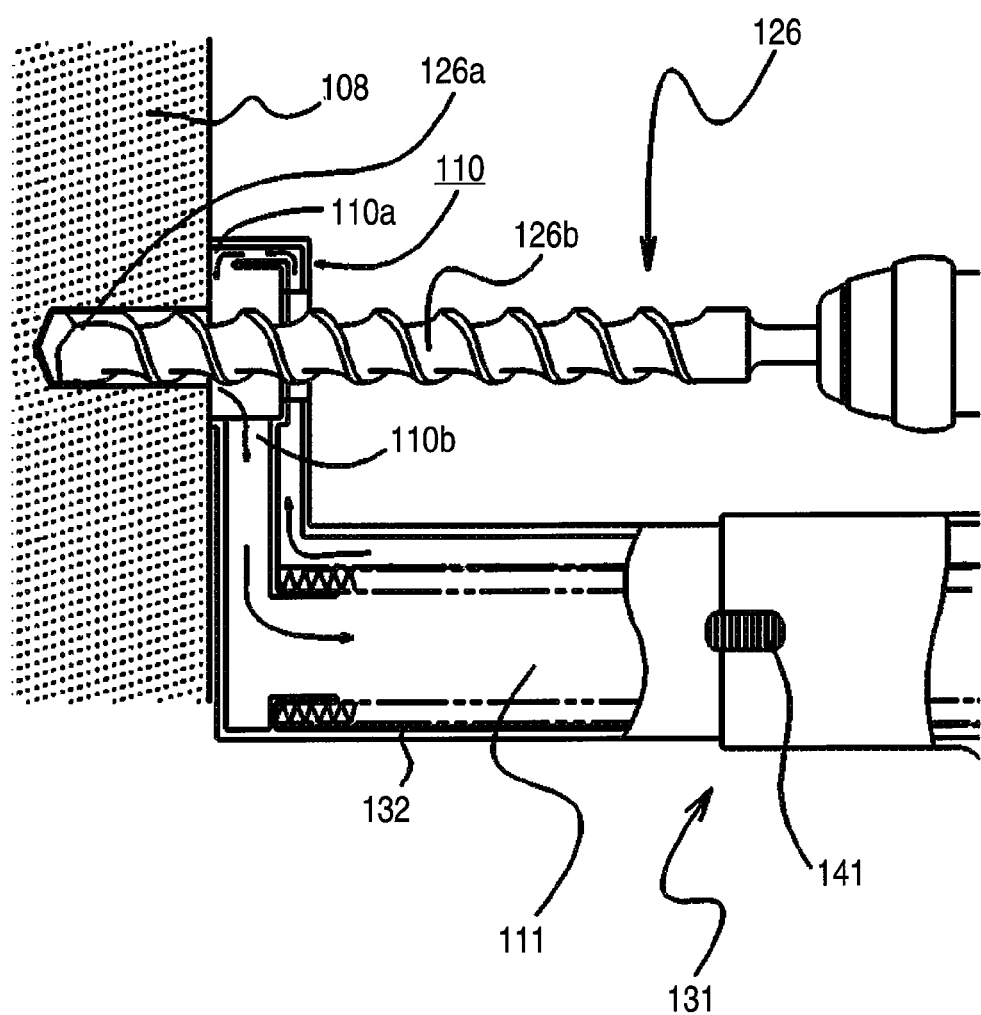
FIG. 15 is a view for illustrating the flow of the air in a dust collection adaptor 110 of the drilling tool of FIG. 13.

A drilling tool in accordance with a third embodiment of the present invention will be described hereinbelow with reference to FIGS. 13 to 15. FIG. 13 is a side view of the drilling tool showing the third embodiment of the present invention, FIG. 14 is a side view showing the state of the drilling tool in use, and FIG. 15 is a view for illustrating the flow of air in a dust collection adaptor 110.

A hammer drill main body 101 has four operational modes of the rotation • strike mode, the rotation mode, the strike mode, and the neutral mode, or has any of the four operational modes. A housing 102 includes a drive unit comprising a motor 118, a strike mechanism unit, a rotation transmission mechanism unit, and a switch mechanism. A handle 103 is provided at a rear end portion (fore-and-aft direction and up-and-down direction are defined as shown in FIG. 13 in the present specification, the same shall apply to other drawings shown below) of the housing 102. The handle 103 is provided with a power switch 104, and a power cord 105 for supplying electricity is connected to the handle 103. On the side portion of the housing 102, a dial-shaped changeover member 106 for changing the operational modes is rotatably provided. An end tool 126 is attached to a tip end portion of the hammer drill 101 and the end tool 126 is supplied with a striking force or a rotation force, or both of the forces to perform a required operation with respect to a workpiece 108.

The step of collecting dust produced during operations in the operational modes of the rotation • strike mode and the rotation mode in the hammer drill main body 101 will be described with reference to FIG. 13. In the drilling operation with respect to the workpiece 108, the operator holds the handle 103 of the hammer drill 101 and operates the power switch 104, thereby driving the motor 118 and causing the end tool 126 attached to the tip end portion of the hammer drill main body 101 to rotate and strike with the driving force of the motor 118. The operator holds the handle 103 of the hammer drill main body 101 and pushes the hammer drill 101 toward the direction of the workpiece 108 so that the end tool 126 crushes the workpiece 108 and produces a drilled hole in the workpiece 108.

The end tool 126 has a tip end portion 126a for crushing the workpiece 108 and a spiral portion 126b having a function of moving the dust produced by crushing the workpiece 108 in the drilled hole. The dust produced by the tip end portion 126a of the end tool 126 during the operation is moved into the dust collection adaptor 110 due to the rotation of the end tool 126 and the configuration of the spiral portion 126b. The dust moved into the dust collection adaptor 110 is guided from a suction port 110b to a dust channel 111 along an arrow by the suction force generated by a dust collection fan 114 provided on a rotary shaft 119 of the motor 118, and filtered and separated into the air and the dust by passing through a filter 113 in a dust collection case 112 provided in a housing 133 of the dust collector, and the separated dust is stored in the dust collection case 112. It is to be noted that the dust collection case 112 is preferably detachable. By detaching the dust collection case 112, it becomes possible to dispose of the stored dust, and clean or change the filter 113.

On the other hand, the separated clean air passes through an air passage 115 and reaches an intake port (not shown) in the axial direction of the dust collection fan 114. Then a part of the separated clean air is returned to the dust collection adaptor 110 and the rest of the air is discharged from a discharge port to the outside of the hammer drill main body 101 by the dust collection fan 114. The structure in the vicinity of the dust collection fan 114 will be described later.

In the hammer drill main body 101, as a power source for driving the end tool 126, the motor 118 is provided in the integral housing 102. When the end tool 126 is driven, the motor 118 rotates and, at the same time, generates heat. In order to restrain the heat generation of the motor 118, a cooling fan 117 is provided on the rotary shaft 119 of the motor 118. Cooling air is sucked from a cooling air intake port (not shown) provided in a tail cover 116 by the suction force of the cooling fan 117, and the cooling air cools the motor 118 according to the direction indicated by the arrow. The cooling air reaches the cooling fan 117 after having cooled the motor, and is discharged from a discharge port which is not shown to the outside of the hammer drill main body 101.

The dust collection adaptor 110 is held by a slider 131 attached to the hammer drill main body 101. In the slider 131, a spring 132 and the retractable dust channel 111 are provided. The dust collection adaptor 110 is biased toward the workpiece 108 by the spring 132 and the slider 131. During the operation for producing a drilled hole, the hammer drill main body 101 moves toward the workpiece 108 as the drilled hole becomes deeper. The dust collection adaptor 110 is biased toward the workpiece 108 by the spring 132. During the drilling operation, as the hammer drill main body 101 moves toward the workpiece 108, the spring 132 is compressed and the slider 131 is retracted so that the dust collection adaptor 110 is constantly in contact with the workpiece 108, and maintains a constant positional relation. The slider 131 is constructed of two members, and the length of the slider 131 is reduced when one member slides into the other member. Thus, the slider 131 is structured to be retractable so that dust collection in accordance with the depth of the drilled hole can be performed. In addition, it is possible to lock the retraction of the slider 131 at an optional position by means of a locking mechanism 141.

The dust produced during the drilling operation is moved into the dust collection adaptor 110 by the spiral structure of the end tool 126, and sucked from the suction port 110b together with the air by the suction force of the dust collection fan 114. As shown in FIG. 15, during the drilling operation, the air blown out from a blowoff port 110a for blowing out the air is sent into the dust collection adaptor 110, and an airflow is generated in the vicinity of the drilled hole so that dust collecting ability can be improved. The amount of the air to be blown out is preferably adjusted to be smaller than that of the air to be sucked in. This adjustment is made to suck the surrounding air in the vicinity of a pierced hole (a hole pierced by the end tool 126) of the dust collection adaptor 110. The suction of the surrounding air can favorably prevent the dust from scattering in the surrounding area.

After the drilling operation, a part of the dust often remains in the drilled hole. Accordingly, the operator moves the blowoff port 110a of the dust collection adaptor 110 close to the drilled hole after the production of the drilled hole as shown in FIG. 14, and operates the power switch 104 to drive the motor 118 and rotate the dust collection fan 114. At that time, the end tool 126 also rotates. However, since the tip end portion 126a is not in contact with the workpiece 108, the workpiece 108 is not damaged. It is preferable to set the length of the slider 31 at the time of the maximum extension such that the tip end portion 126a is not in contact with the workpiece 108 as shown in FIG. 14.

As for the flow of the air in the hammer drill main body 101, the air reaches the dust collection fan 114 from the air passage 115, and is discharged from the discharge port which is not shown to the outside of the hammer drill main body 101, while a part of the air is returned to the dust collection adaptor 110.

Figure 16:
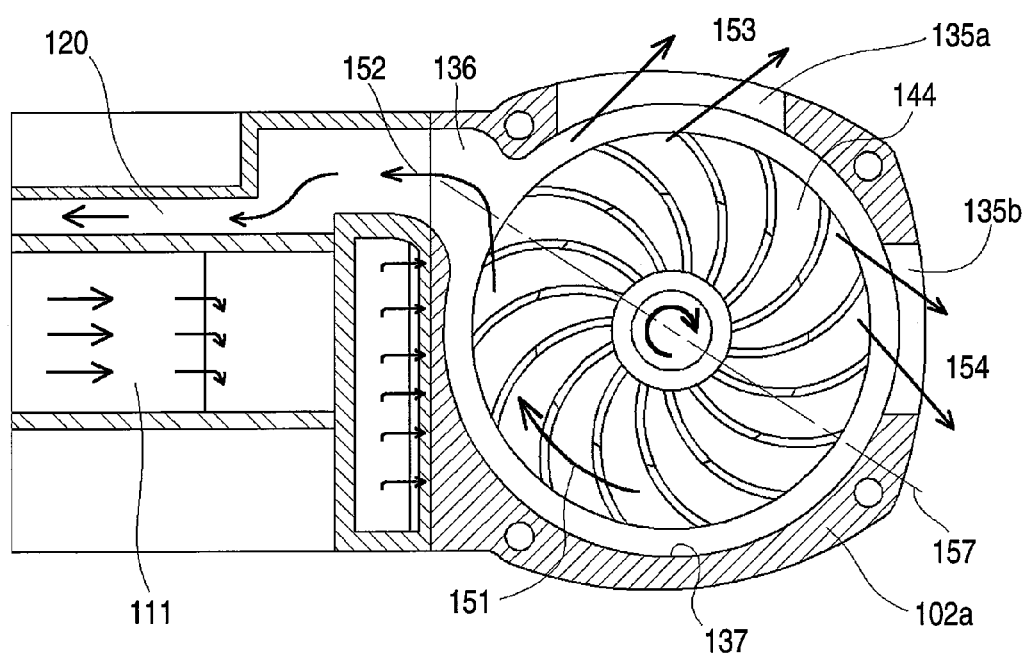
FIG. 16 is a cross-sectional view of an A-A portion of FIG. 14.

Next, the structure in the vicinity of the dust collection fan 114 will be described in detail by using FIGS. 16 and 17. FIG. 16 is a cross-sectional view of an A-A portion of FIG. 14. The dust collection fan 114 is a centrifugal fan which sucks the air flowing from the air passage 115 through an intake port (not shown) formed in the axial direction, and sends the air in the circumferential direction by the rotation force of vanes. The airflow to be sent is generated in a direction indicated by an arrow 151 in FIG. 16. The most part of the airflow is flown from an airflow sending port 136 in a direction indicated by an arrow 152, and is sent to the dust collection adaptor 110 via a guide channel 120. The rest of the airflow is discharged from a first discharge port 135a and a second discharge port 135b formed in a housing 102a as shown by arrows 153 and 154. In the present embodiment, the housing 102a is a part of the housing 102 of the hammer drill main body 101 and is an integrally-formed plastic housing.

The air which has flown into the airflow sending port 136 then flows into the dust collection adaptor 110 via the guide channel 120. The guide channel 120 is disposed alongside the dust channel 111 in the vicinity of the airflow sending port 136 of FIG. 16, while, in the slider 131, the guide channel 120 is disposed above the dust channel 111. However, the disposition is not limited thereto. A coaxial disposition may be adopted in which the dust channel 111 is disposed in an inner area, while the guide channel 120 is disposed in an outer area.

In FIG. 16, in a direction of rotation of the dust collection fan 114 (clockwise direction in the drawing), the discharge ports are provided at two locations. Both of the first and second discharge ports 135a and 135b are disposed at "backward" positions from the airflow sending port 136. As shown in a conceptual view of FIG. 17, when a reference line 157 is drawn from the airflow sending port 136 to a center point 160 of the fan, the wording "forward" positions used herein denote positions in a direction indicated by an arrow 155 when viewed from the position of the airflow sending port 136. Similarly, "backward" positions denote positions in a direction indicated by an arrow 156 when viewed from the position of the airflow sending port 136. It is to be noted that the forward positions and the backward positions are reversed when the direction of rotation of the dust collection fan 114 is reversed.

Figure 17:
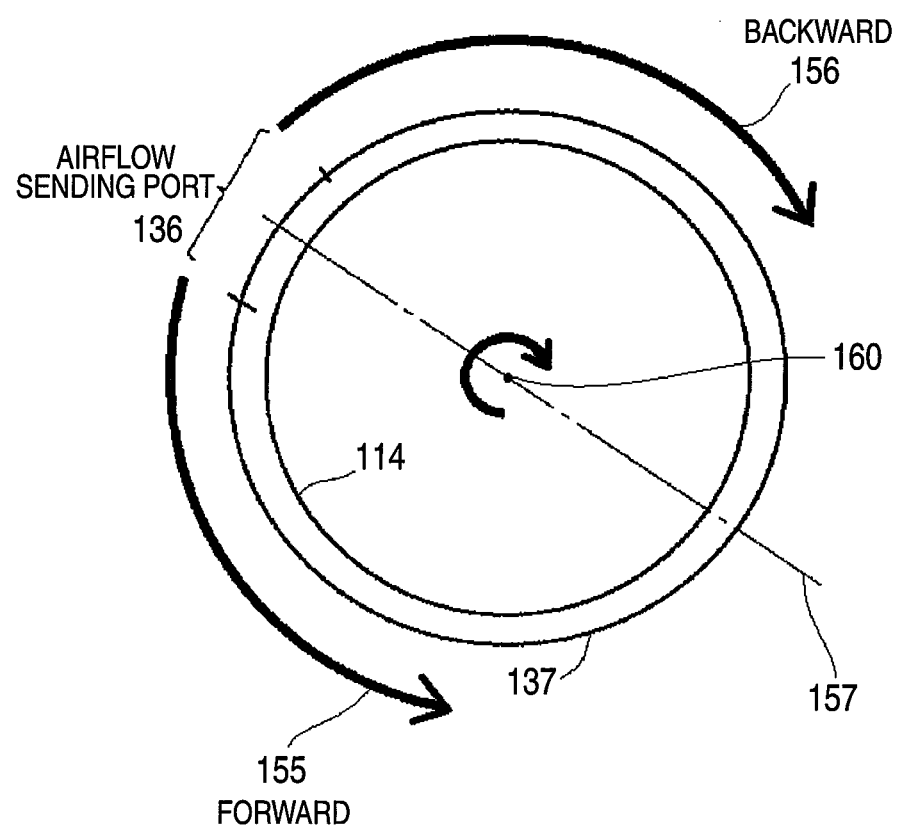
FIG. 17 is a conceptual view for illustrating a positional relation of an airflow sending port 136 and first and second discharge ports 135a and 135b.

In accordance with the definition in FIG. 17, the first discharge port 135a and the second discharge port 135b are both disposed at the backward positions when viewed from the airflow sending port 136. In a fan which generates the airflow by its turning force such as the dust collection fan 114 according to the present embodiment, an opening port disposed at the farthermost position receives high pressure. The path for sending the airflow into the dust collection adaptor 110 has a high resistance to the inflow due to its complicated configuration so that high pressure is required in order to effectively send the airflow. Therefore, by setting the airflow sending port 136 at the forward position in the direction of rotation of the dust collection fan 114 when viewed from the discharge port 135, it becomes possible to most effectively send the airflow into the dust collection adaptor 110.

Figure 18:
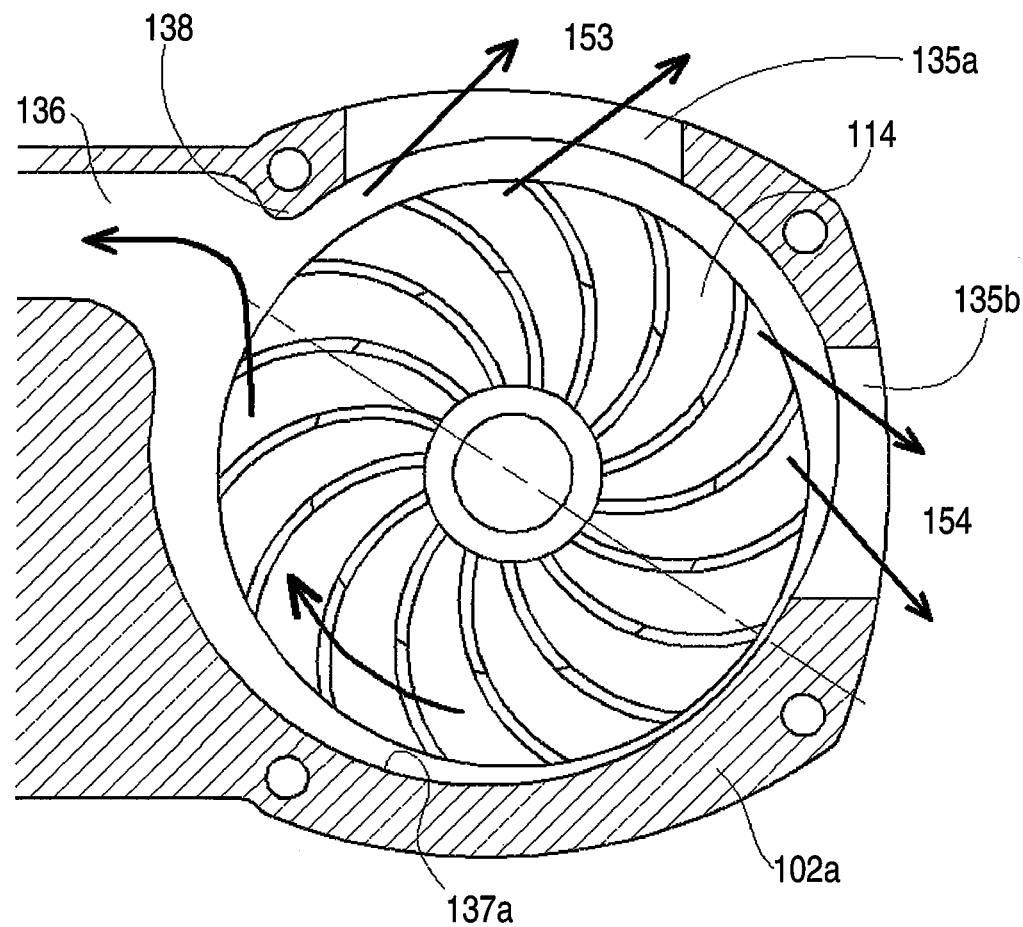
FIG. 18 is a cross-sectional view of a dust collection fan portion showing a fourth embodiment of the present invention.

Next, a fourth embodiment of the present invention will be described by using FIGS. 18 to 20. FIG. 18 is a cross-sectional view of a dust collection fan portion showing the fourth embodiment of the present invention, FIG. 19 is a conceptual view for illustrating a positional relation between the dust collection fan 114 and an inner wall 137 of the housing, and FIG. 20 is an enlarged view for illustrating a positional relation of a guide portion 138.

As can be seen from FIG. 18, the distance between the inner wall 137a and the outer peripheral end of the dust collection fan 114 becomes gradually shorter with distance from the airflow sending port 136 in both forward and backward directions. This state will be further described by using the conceptual view of FIG. 19. In FIG. 19, in order to understand the positional relation, a reference line 157 which extends from the airflow sending port 136 to the other side through a center point 161 of the inner wall of the housing and an auxiliary line 158 which is perpendicular to the reference line 157 and extends through the center point 161 are drawn.

The center point 160 of the dust collection fan 114 is offset relative to the center point 161 of the inner wall of the housing.

Figure 19:
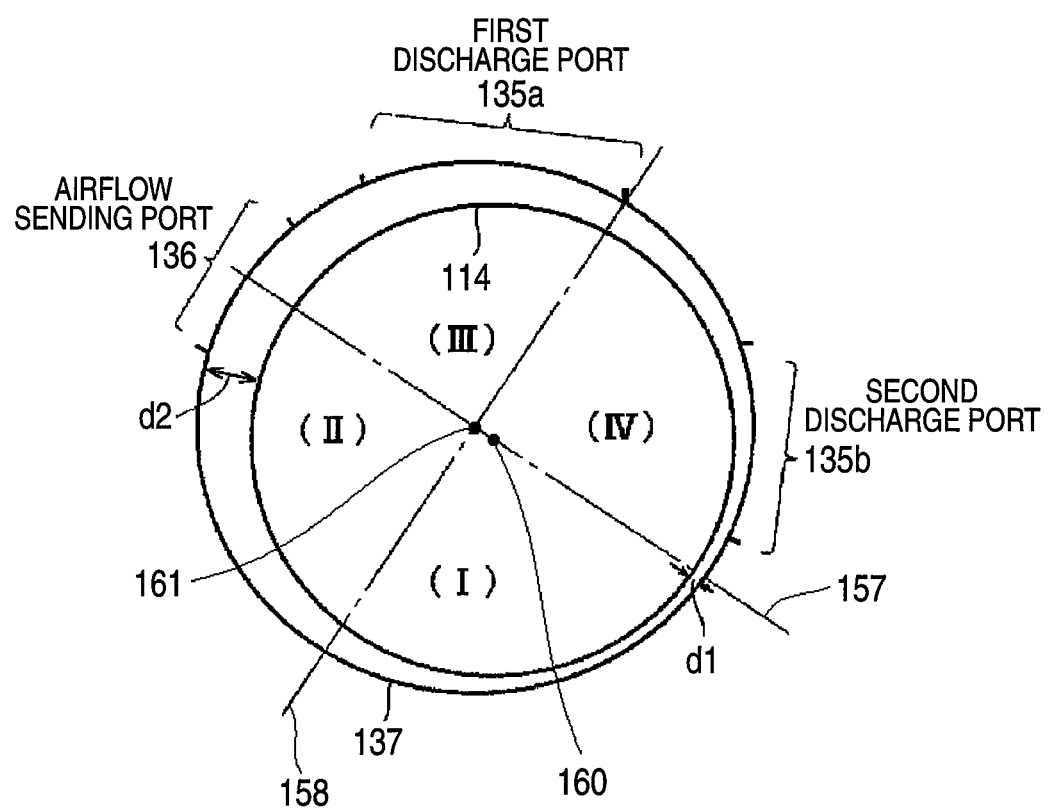
FIG. 19 is a conceptual view for illustrating a positional relation of the dust collection fan 14 and an inner wall 137 of a housing.
Figure 20:
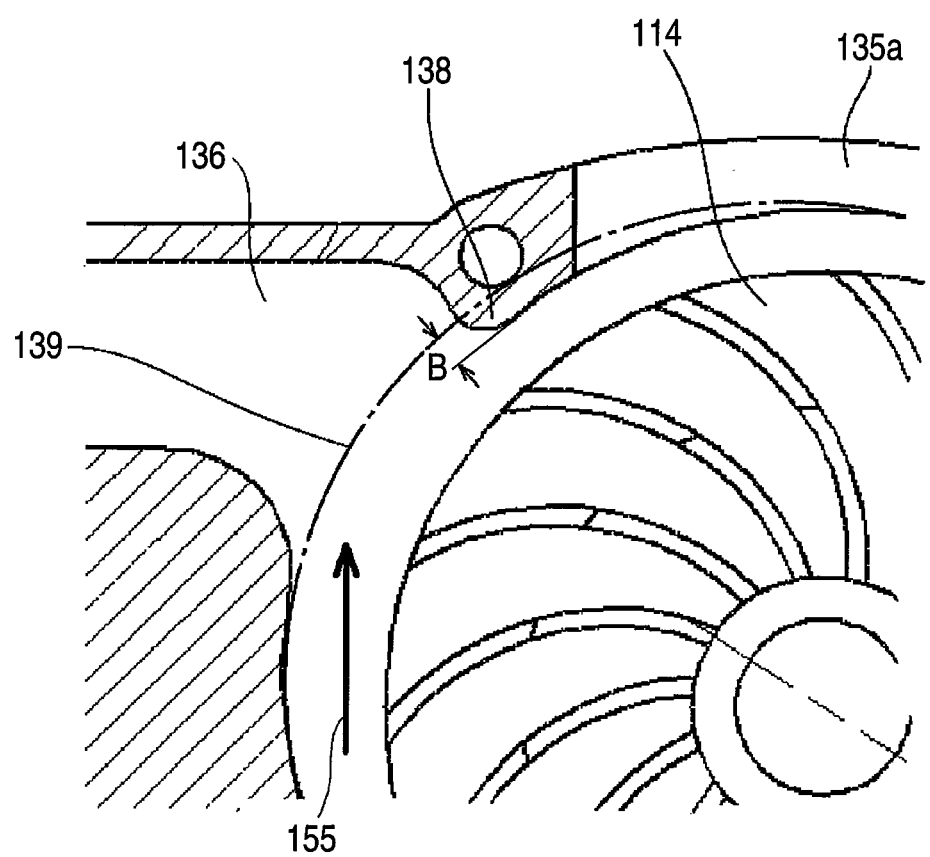
FIG. 20 is a partially enlarged view for illustrating a positional relation of a guide portion 138 of FIG. 18.

When regions defined by the reference line 157 and the auxiliary line 158 are defined as regions (I), (II), (III), and (IV) as shown in FIG. 19, the airflow sending port 136 is formed in the regions (II) and (III). The first discharge port 135a is formed in the region (III). The second discharge port 135b is formed in the region (IV). This disposition allows an increase in the inflow pressure into the airflow sending port 136, the flow speed, and the amount of the airflow. As a result, it becomes possible to effectively send the airflow into the dust collection adaptor 110. However, since the relation described above is influenced by other factors such as the heights of the airflow sending port and the discharge port in a vertical direction or the like, the disposition may be set in consideration of these factors.

In the fourth embodiment, as a device to increase the inflow pressure, a guide portion 138 protruding toward the direction of the center of the centrifugal fan is additionally formed adjacent to the downstream side of the airflow sending port 136. The detail thereof will be described by using FIG. 20. FIG. 20 is a partially enlarged view for illustrating a positional relation of the guide portion 138 of FIG. 6.

In FIG. 20, in order to indicate the position of the cylindrical inner wall of the housing, a reference line 139 in the dashed line is drawn. As can be seen from the comparison between the reference line 139 and the state of the protrusion of the guide portion 138, the guide portion 138 obtained by protruding the inner wall portion on the downstream side of the airflow sending port 136 by the distance B in the direction of the center of the centrifugal fan is formed. Thus, by forming the guide portion 138, the airflow flowing toward the direction indicated by an arrow 155 hits against the guide portion 138, and the most part of the airflow is guided to the direction of the airflow sending port 136. As a result, the amount of the airflow to the airflow sending port 136 is increased and, moreover, the effect of an increase in the flow speed resulting from an increase in the pressure for sending the air is obtained.

As is apparent from the foregoing description, in accordance with the present invention, it is possible to secure the sufficient amount of the airflow sent to the vicinity of the drilled hole and improve the dust collection efficiency in the collection of the dust produced during the drilling operation and performance in the removal of the dust remaining in the drilled hole after the drilling operation. As a result, the job site and the environment of the operator can be improved.

In addition, in accordance with the present invention, in the drilling tool having the dust collector provided with the suction port for sucking the air together with the dust and the blowoff port for blowing the air, the effect of being able to efficiently collect the dust and send the air by using single centrifugal fan is achieved.

Although the description has thus been given based on the embodiments showing the present invention, the present invention is not limited to the embodiments described above. It will be understood that various changes and modifications may be made in the invention without departing from the gist thereof.

For example, although the drilling tool using the electric motor has been described in the invention of the present application, the driving source is not limited to the electric motor. The present invention may be applied to a drilling tool using an internal combustion engine or compressed air. Further, integral-type fans may be used for the dust collection fan 114 and the cooling fan 117 instead of individual-type fans. In that case, a structure may be adopted in which the air is sent to the motor 118 from the discharge port of the dust collection fan.

What is claimed is:

1. A drilling tool comprising:
   a motor;
   a transmission drive unit for transmitting a rotation force of the motor to rotate a drill bit;
   a dust collector for collecting dust produced from a workpiece drilled by the drill bit,
   the dust collector being provided with a pierced portion pierced by the drill bit, a dust collection port for sucking the produced dust and its surrounding air, and a blowoff port for blowing air against a vicinity of the piercing drill bit; and
   a fan for generating an air flow flowing from the dust collection port to an outside of a housing, a part of the air sucked from the dust collection port is returned to the blowoff port,
   wherein the dust collector has a retractable duct having a passage extending from the dust collection port to the fan via a dust collection filter and a passage extending from the fan to the blowoff port, and
   wherein a direction of the airflow blown from the blowoff port is a direction generally in parallel with an axial direction of the drill bit in the pierced portion of the dust collector.

2. The drilling tool according to claim 1, wherein an amount of the air sucked from the dust collection port of the dust collector is not less than the amount of the air blown from the blowoff port.

3. The drilling tool of claim 1, wherein the drill bit is provided at a position between the dust collection port and the blowoff port in the dust collector.

4. The drilling tool of claim 1, wherein the dust collector has a dust collection adaptor forming the pierced portion at a tip end portion of the retractable duct, and, in the dust collection adaptor, the passage extending to the blowoff port and the passage extending from the dust collection port are disposed side by side in a left-to-right direction when viewed from a longitudinal axis of the drill bit.

5. The drilling tool according to claim 1 further comprising a dust collection case for storing the dust sucked from the dust collection port.

6. The drilling tool of claim 1, wherein the drill bit is driven by a motor and the fan is rotated by the motor.

7. The drilling tool according to claim 1, wherein the dust collector is provided with the blowoff port for blowing air in an axial direction of the drill bit.

8. The drilling tool according to claims 1, wherein the dust collector has a housing connected to the retractable duct, and the filter is detachably attached in the housing.

9. The drilling tool according to claim 1, wherein the retractable duct is formed of a fixed portion and a retractable portion, attached generally in parallel with a longitudinal direction of the drill bit, and retractable in the longitudinal direction.

10. The drilling tool according to claim 9, wherein a direction of the airflow blown from the blowoff port is a circumferential direction of the pierced portion of the dust collector which is a direction toward a central portion.

11. The drilling tool according to claim 10, wherein the dust collector has a housing connected to the retractable duct, and the filter is detachably attached in the housing.

12. The drilling tool of claim 11, wherein the dust collector is detachable with respect to the drilling tool.

13. The drilling tool of claim 12, wherein the pierced portion is cylindrical, and a shutter member for limiting passage of the air between the drill bit and the pierced portion is provided on one end side of the pierced portion.

\* \* \* \* \*